United States Patent
Kim et al.

(10) Patent No.: US 12,058,686 B2
(45) Date of Patent: Aug. 6, 2024

(54) METHOD AND APPARATUS FOR SUPPORTING A RATE MATCHING FOR OVERLAPPED RESOURCES IN NC-JT IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 17/310,564

(22) PCT Filed: Feb. 12, 2020

(86) PCT No.: PCT/KR2020/001985
§ 371 (c)(1),
(2) Date: Aug. 11, 2021

(87) PCT Pub. No.: WO2020/166976
PCT Pub. Date: Aug. 20, 2020

(65) Prior Publication Data
US 2022/0104182 A1 Mar. 31, 2022

(30) Foreign Application Priority Data
Feb. 15, 2019 (KR) .......... 10-2019-0018246

(51) Int. Cl.
H04W 72/23 (2023.01)
H04L 5/00 (2006.01)

(52) U.S. Cl.
CPC .......... *H04W 72/23* (2023.01); *H04L 5/0048* (2013.01)

(58) Field of Classification Search
CPC .... H04W 72/23; H04L 5/0048; H04L 5/0035; H04B 7/024
See application file for complete search history.

(56) References Cited

U.S. PATENT DOCUMENTS

2020/0015200 A1\* 1/2020 Vilaipornsawai ..... H04W 72/23
2020/0136690 A1\* 4/2020 Noh ..................... H04W 72/23
(Continued)

FOREIGN PATENT DOCUMENTS

| KR | 20160131944 | 11/2016 |
|---|---|---|
| WO | 2018231001 | 12/2018 |
| WO | 2019031856 | 2/2019 |

OTHER PUBLICATIONS

PCT International Application No. PCT/KR2020/001985, International Search Report dated May 27, 2020, 5 pages.
(Continued)

*Primary Examiner* — Deepa Belur
(74) *Attorney, Agent, or Firm* — LEE, HONG, DEGERMAN, KANG & WAIMEY

(57) ABSTRACT

Disclosed are a method for transmitting and receiving data in a wireless communication system and an apparatus therefor. In specific, the method for transmitting and receiving data in a wireless communication system comprises the steps of: receiving first downlink control information (DCI) from a first base station and receiving second downlink control information (DCI) from a second base station; and, in a first resource region and a second resource region that are allocated on the basis of the first DCI, receiving first data from the first base station and, in the first resource region that is allocated on the basis of the second DCI, receiving second data from the second base station, wherein a rate matching of resources related to a demodulation reference
(Continued)

signal (DMRS) may be set differently in each of the first resource region and the second resource region.

15 Claims, 12 Drawing Sheets

(56) References Cited

U.S. PATENT DOCUMENTS

| | | | | |
|---|---|---|---|---|
| 2020/0196333 A1* | 6/2020 | Lin | ..................... | H04L 1/0026 |
| 2020/0221428 A1* | 7/2020 | Moon | ..................... | H04B 7/024 |
| 2020/0229156 A1* | 7/2020 | Park | ..................... | H04L 5/0094 |
| 2021/0204260 A1* | 7/2021 | Liu | ..................... | H04L 5/0035 |
| 2021/0273763 A1* | 9/2021 | Wang | ..................... | H04L 5/0051 |
| 2021/0321419 A1* | 10/2021 | Li | ..................... | H04L 5/0051 |
| 2023/0413289 A1* | 12/2023 | Lei | ..................... | H04W 72/232 |

OTHER PUBLICATIONS

LG Electronics, "Enhancements on multi-TRP/panel transmission," R1-1900622, 3GPP TSG RAN WG1 Ad-Hoc Meeting 1901, Jan. 2019, 11 pages.

Vivo, "Discussion on multi PDCCH based multi TRP transmission," R1-1900137, 3GPP TSG RAN WG1 Ad-Hoc Meeting 1901, Jan. 2019, 17 pages.

* cited by examiner

【FIG. 1】
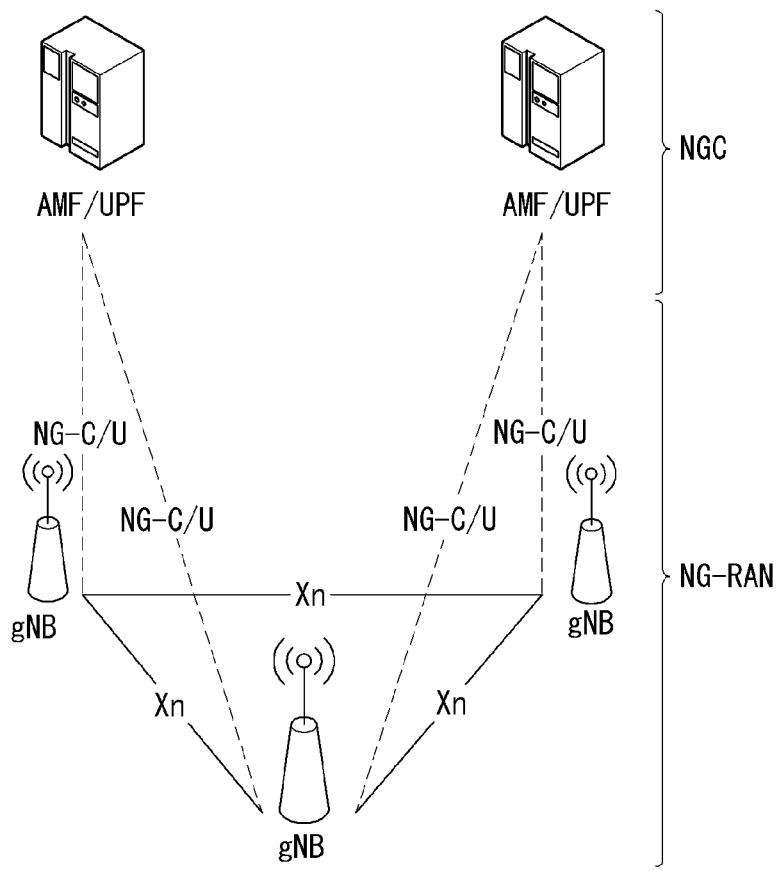
【FIG. 2】
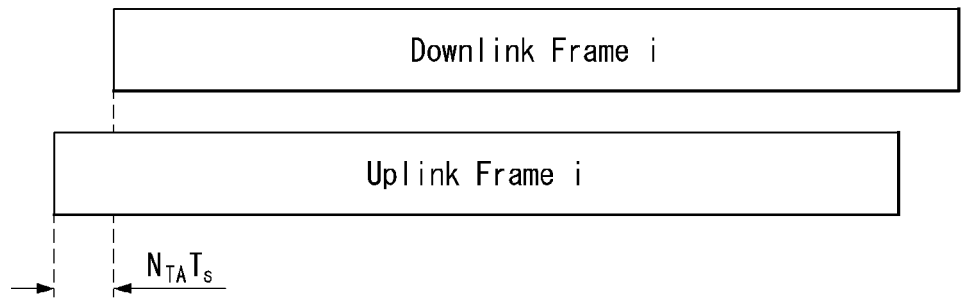

[FIG. 3]
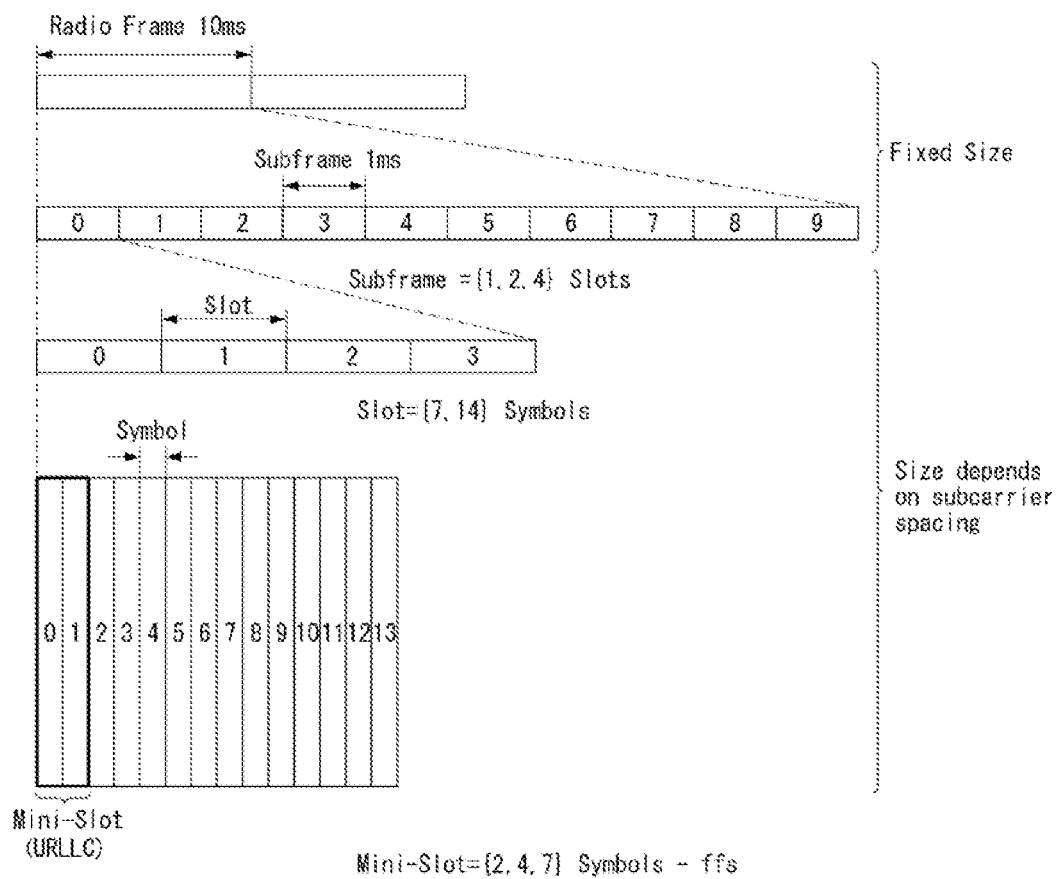

【FIG. 4】
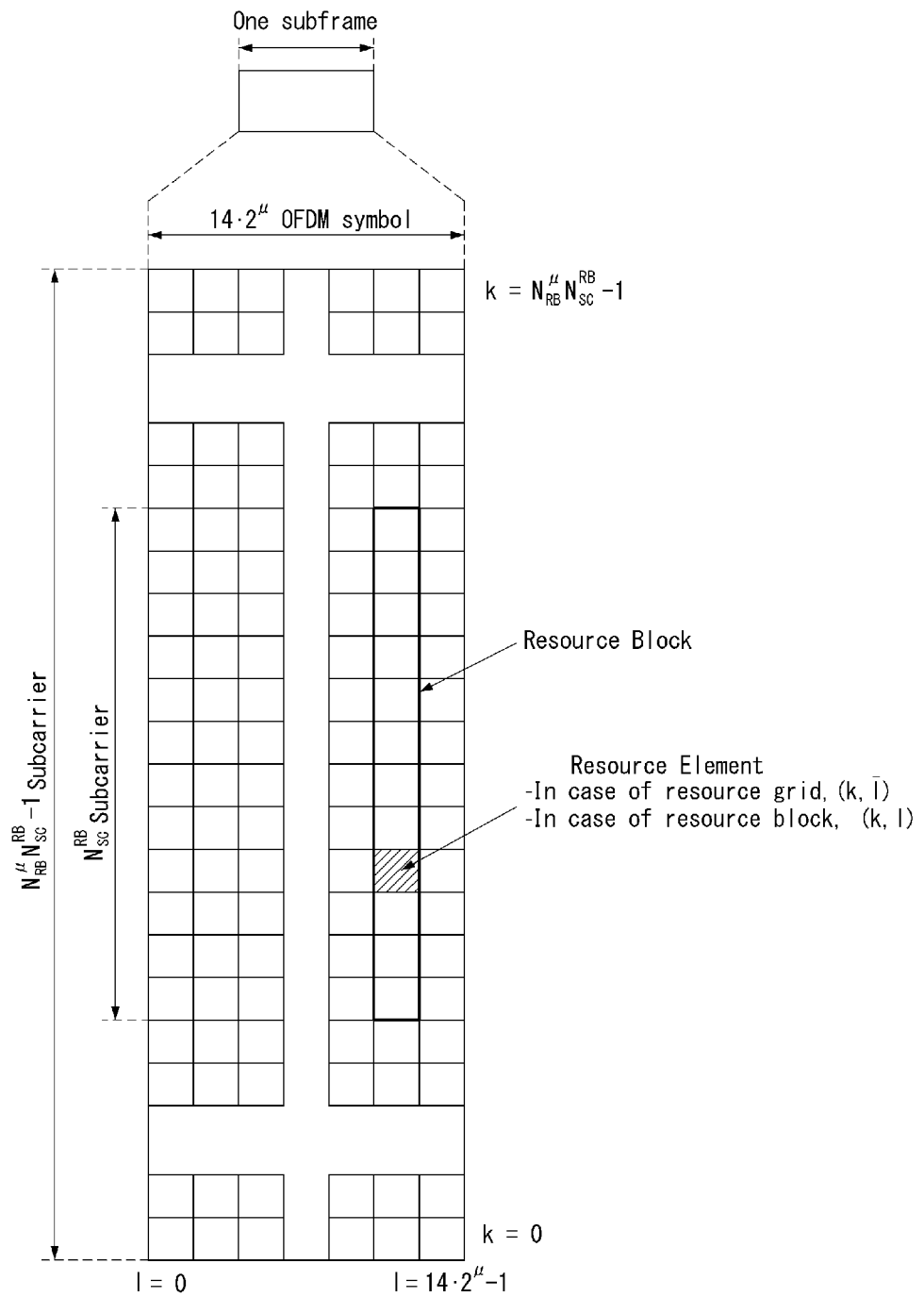

[FIG. 5]
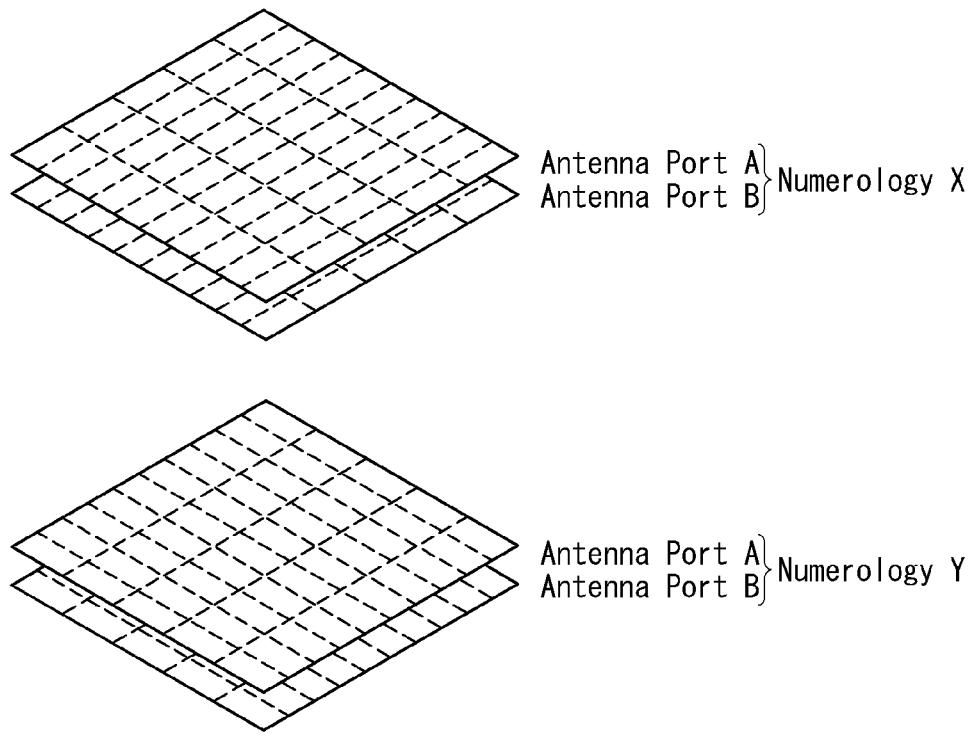
[FIG. 6]
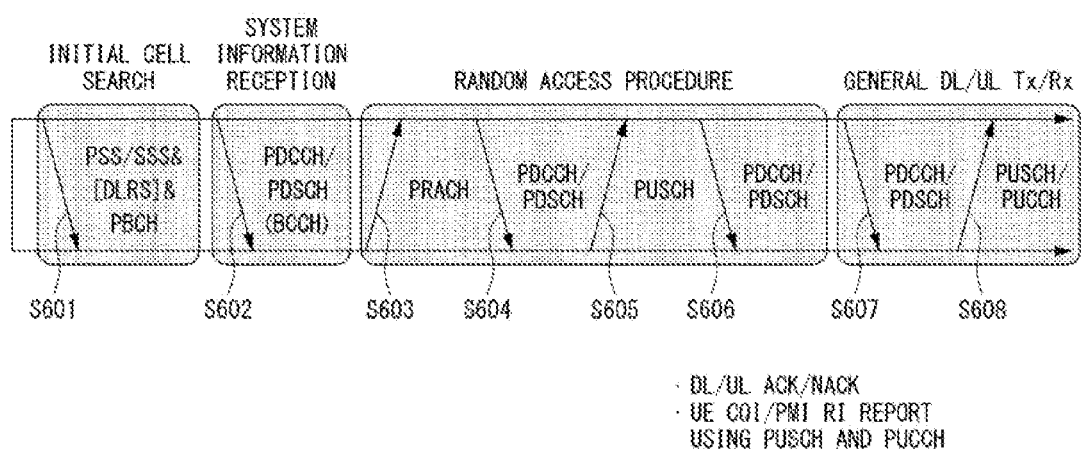

[FIG. 7]
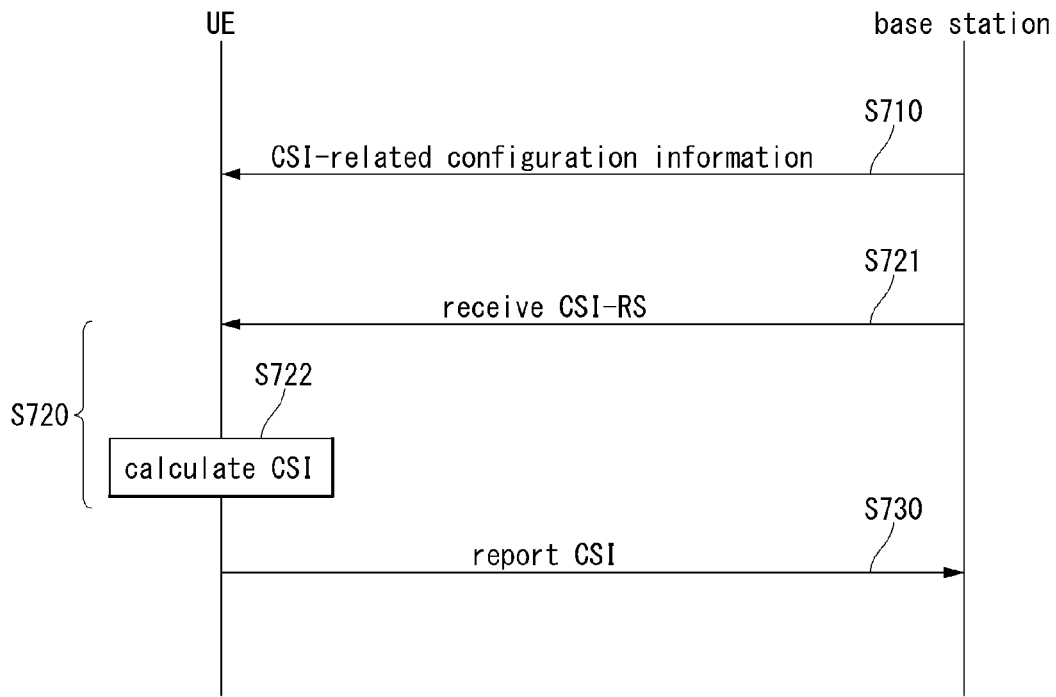
[FIG. 8]
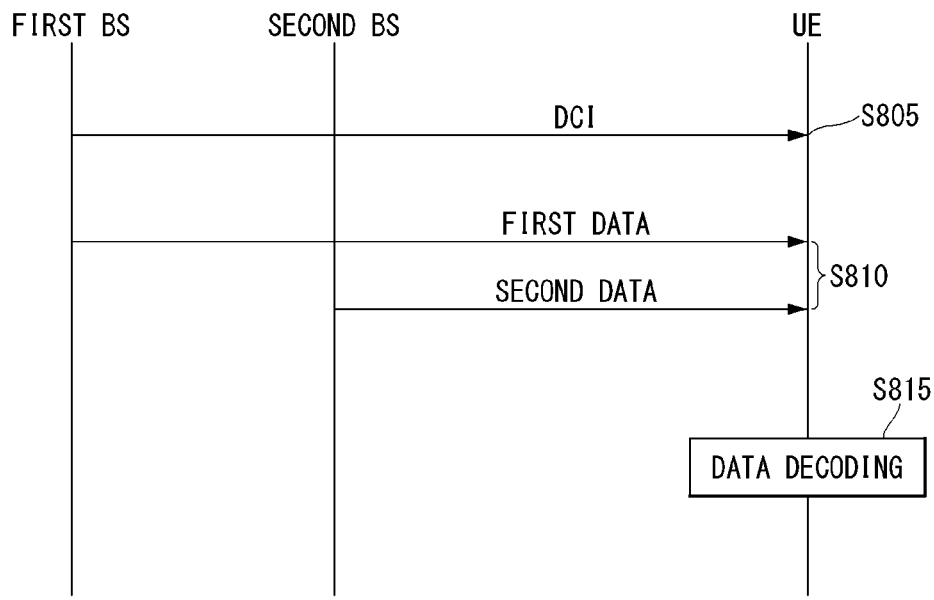

【FIG. 9】
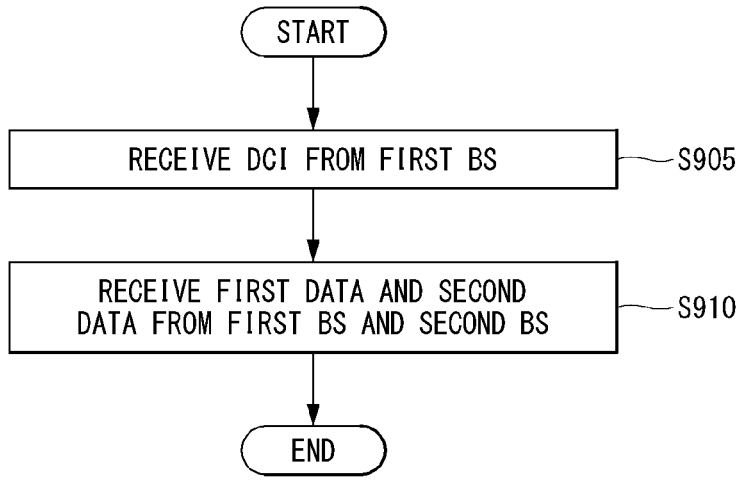
【FIG. 10】
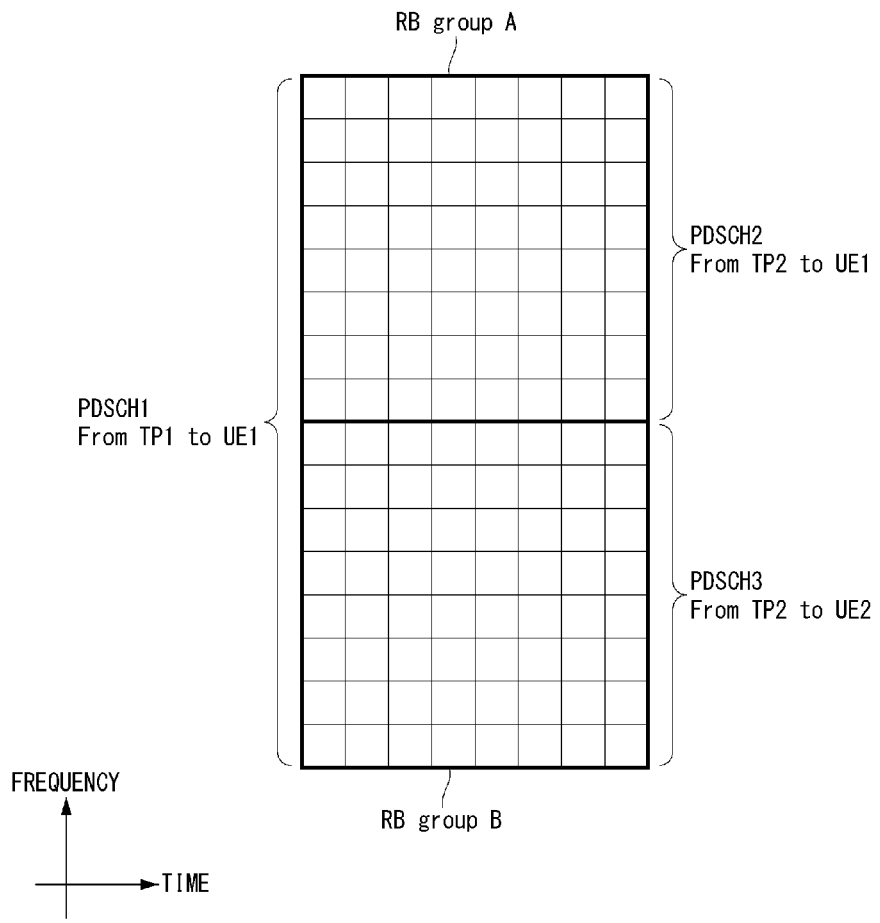

[FIG. 11]
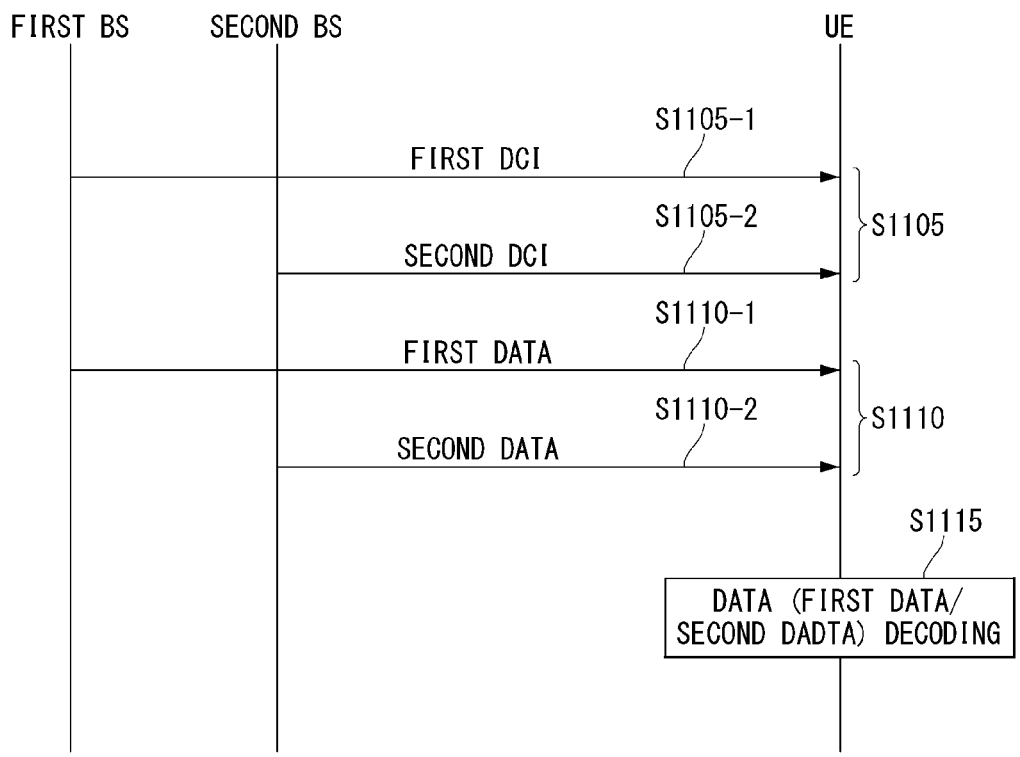
[FIG. 12]
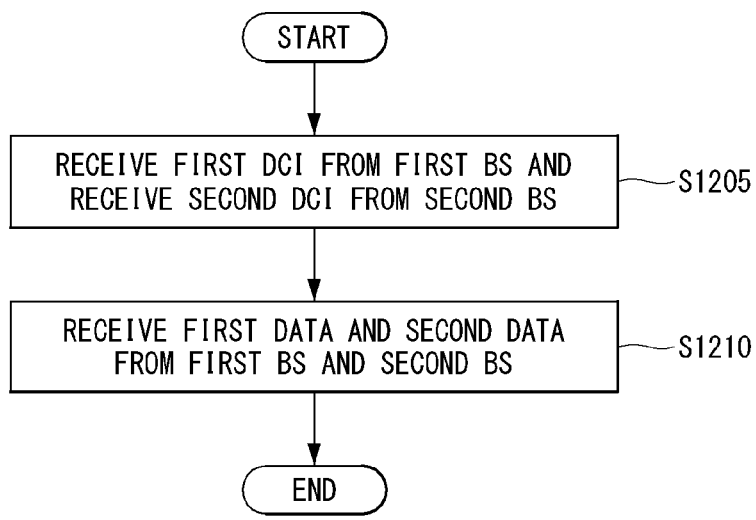

[FIG. 13]
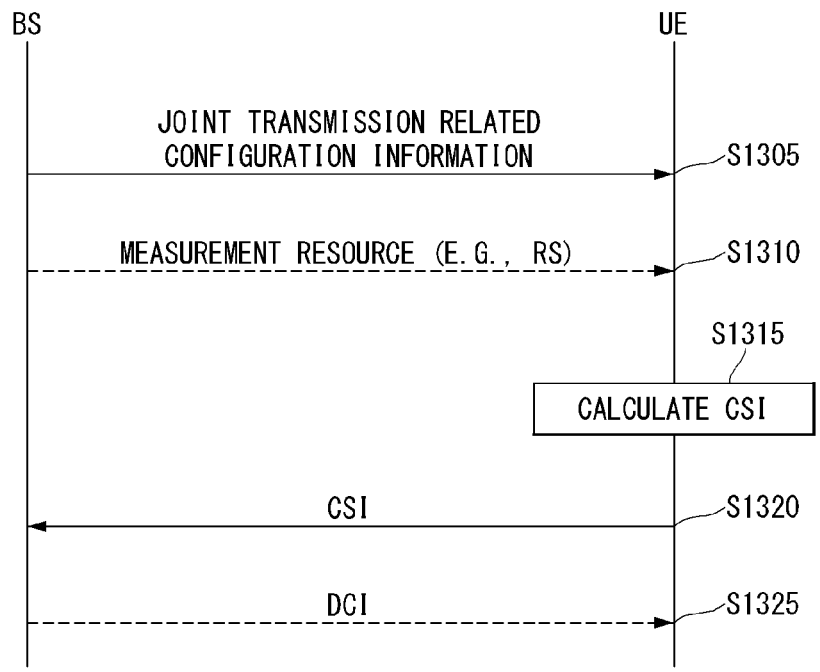
[FIG. 14]
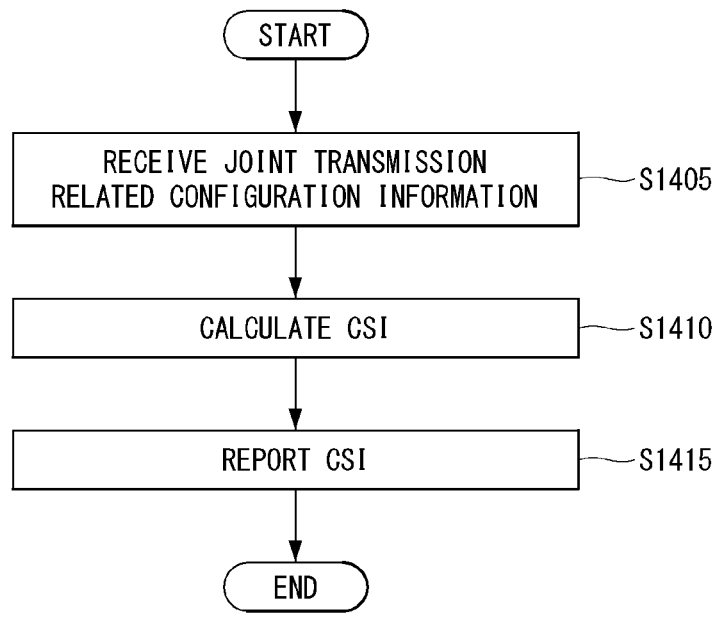

[FIG. 15]
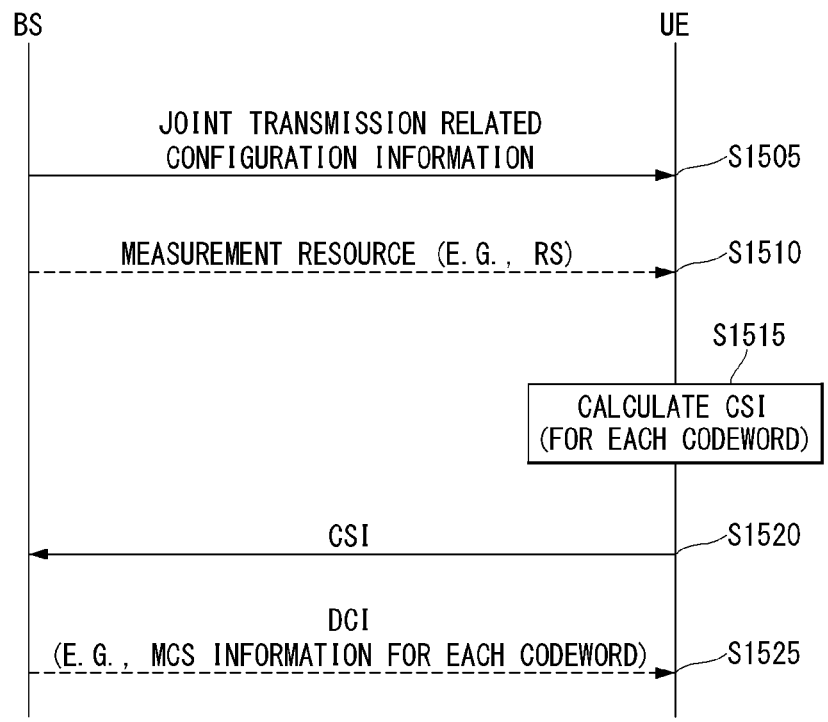
[FIG. 16]
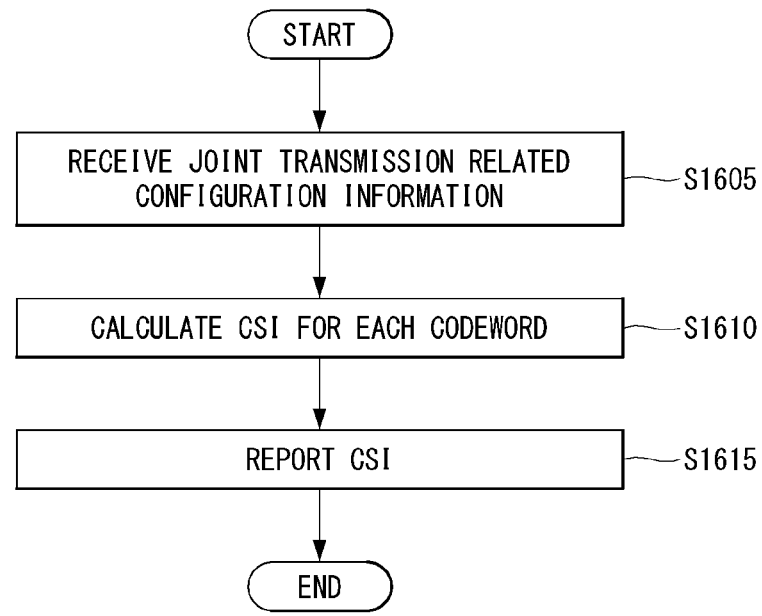

[FIG. 17]
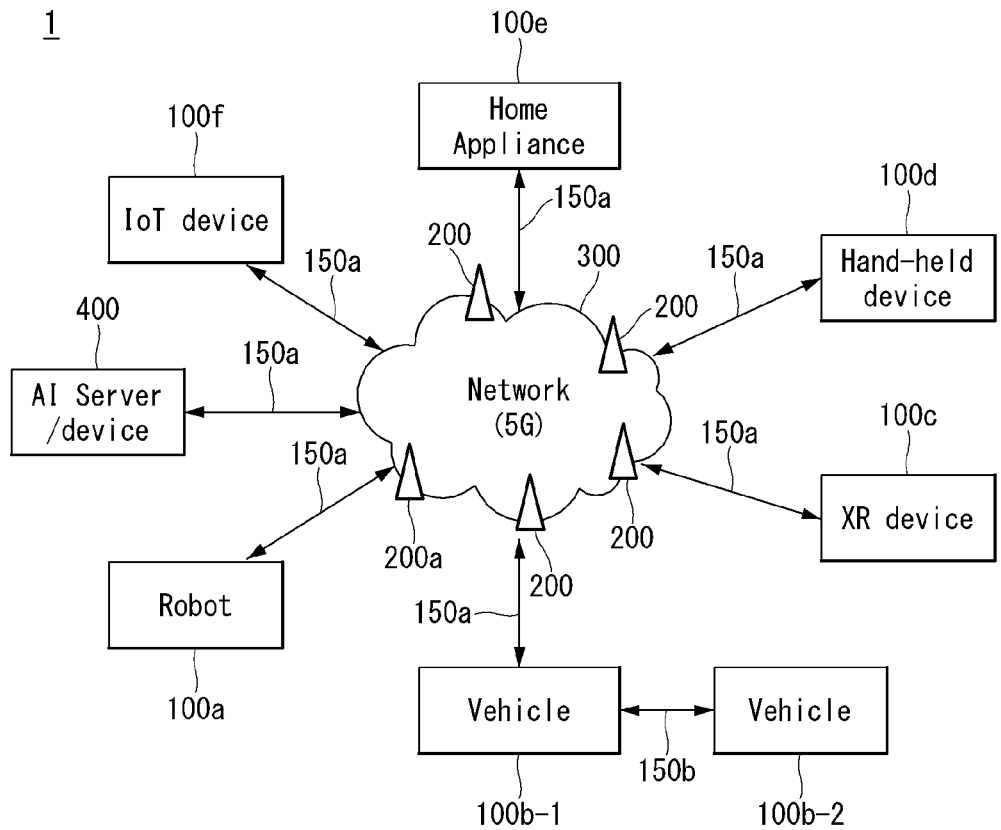
[FIG. 18]
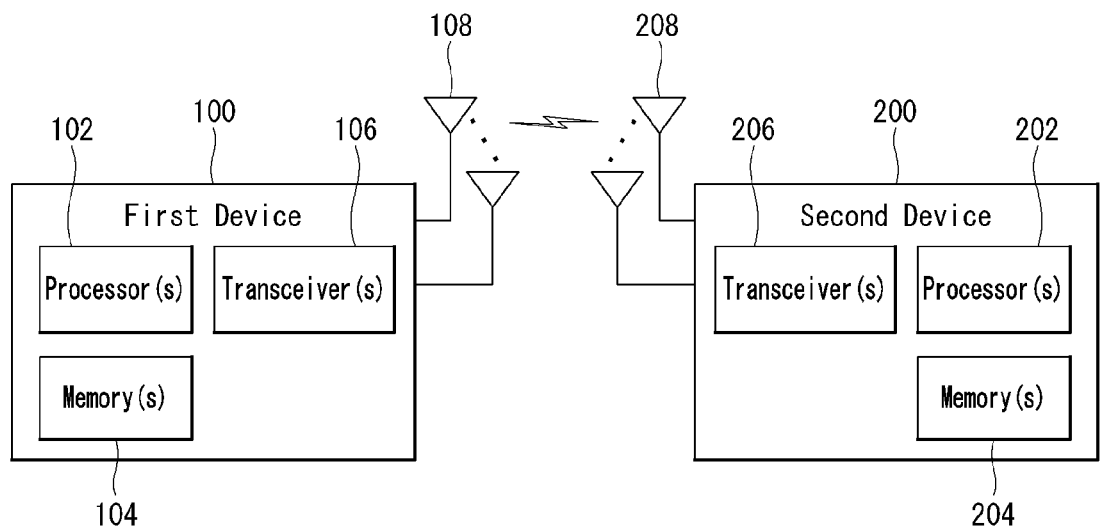

[FIG. 19]
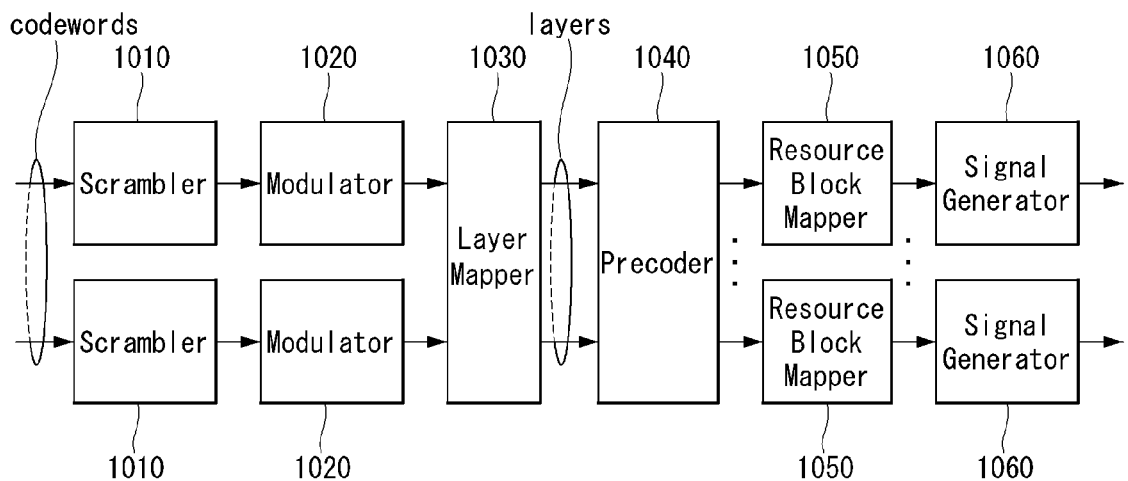
[FIG. 20]
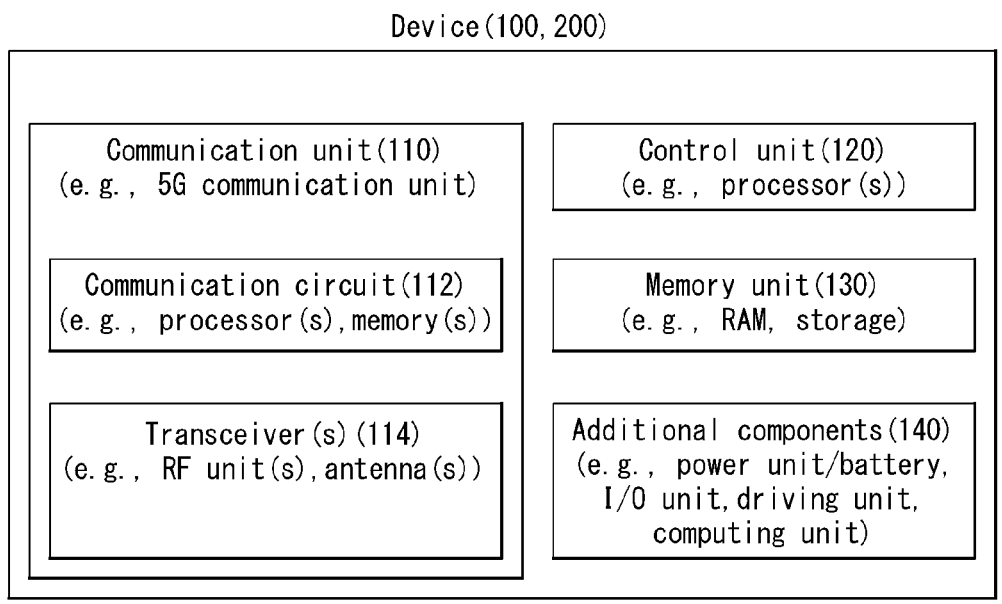

[FIG. 21]
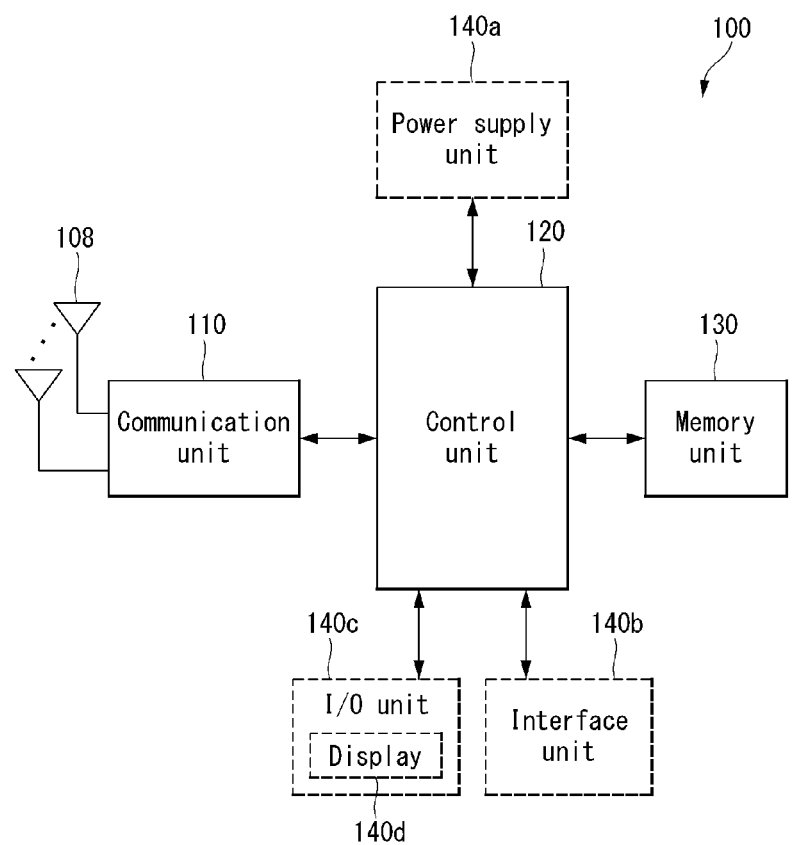

METHOD AND APPARATUS FOR SUPPORTING A RATE MATCHING FOR OVERLAPPED RESOURCES IN NC-JT IN WIRELESS COMMUNICATION SYSTEM

CROSS-REFERENCE TO RELATED APPLICATIONS

This application is the National Stage filing under 35 U.S.C. 371 of International Application No. PCT/KR2020/001985, filed on Feb. 12, 2020, which claims the benefit of earlier filing date and right of priority to Korean Application No. 10-2019-0018246, filed on Feb. 15, 2019, the contents of which is hereby incorporated by reference herein in its entirety.

TECHNICAL FIELD

The present disclosure relates to a wireless communication system, and more particularly, to a method for transmitting and receiving data in consideration of joint transmission, and an apparatus supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes methods that may be proposed when considering joint transmission between a plurality of base stations (BSs) (e.g., a plurality of transmission points (TPs), etc.) and a terminal (or a user equipment (UE)) in a wireless communication system.

The present disclosure proposes a method of configuring a resource allocation field in consideration of the joint transmission and a method of identifying a resource allocation region.

The present disclosure proposes for configuring rate matching or puncturing of resources related to each DMRS in overlapped resources and non-overlapped resources when some time resources and/or frequency resources overlap, in consideration of the joint transmission.

The present disclosure proposes a method of calculating and/or reporting CSI in a case where some time resources and/or frequency resources overlap, in consideration of the joint transmission.

The present disclosure proposes a method of calculating and/or reporting CSI in consideration of codewords classified according to whether time resources and/or frequency resources overlap, in consideration of the joint transmission.

Technical objects to be achieved in the disclosure are not limited to the aforementioned technical objects, and other technical objects not described above may be evidently understood by a person having ordinary skill in the art to which the disclosure pertains from the following description.

Technical Solution

In an aspect, a method for receiving data by a user equipment (UE) supported by a plurality of BSs in wireless communication system includes receiving, from a first BS, first downlink control information (DCI), and receiving, from a second BS, second DCI; and receiving, from the first BS, first data in a first resource region and a second resource region allocated based on the first DCI, and receiving, from the second BS, second data in the first resource region allocated based on the second DCI, wherein rate matching of resources related to a Demodulation Reference Signal (DMRS) is configured differently in the first resource region and the second resource region.

Also, in the method according to an embodiment of the present disclosure, the DMRS may include a first DMRS of the first BS and a second DMRS of the second BS, and the first DCI may include information related to the first DMRS, and the second DCI includes information related to the second DMRS.

Also, in the method according to an embodiment of the present disclosure, rate matching of resources related to the first DMRS and the second DMRS may be configured in the first resource region, and rate matching of resources only related to the first DMRS may be configured in the second resource region.

Also, in the method according to an embodiment of the present disclosure, each of the first DCI and the second DCI may include information related to the rate matching, and information related to the rate matching included in the first DCI is configured based on resource allocation information for the second data included in the second DCI.

Also, in the method according to an embodiment of the present disclosure, rate matching of a resource related to the second DMRS may be configured in only the first resource region based on the resource allocation information.

Also, in the method according to an embodiment of the present disclosure, in the first resource region, rate matching of a resource related to the first DMRS and puncturing of a resource related to the second DMRS may be configured, and in the second resource region, rate matching may be configured to only the resource related to the first DMRS.

Also, in the method according to an embodiment of the present disclosure, information related to the first DMRS may include a first DMRS port group to which one or more ports for the first BS belong, and information related to the second DMRS may include a second DMRS port group to which one or more ports for the second BS belong, and Also, in the method according to an embodiment of the present disclosure, a resource region in which the first data is received may be determined based on the first DMRS port group, and a resource region in which the second data may be received is determined based on the second DMRS port group.

Also, in the method according to an embodiment of the present disclosure, the second DMRS port group may only be associated with rate matching of the first resource region.

In another aspect, a user equipment (UE) receiving data supported by a plurality of BSs in a wireless communication system, includes one or more transceivers; one or more processors; and one or more memories that store instructions for operations executed by the one or more processors, and are connected to the one or more processors, wherein the operations include: receiving, from a first BS, first downlink control information (DCI), and receiving, from a second BS, second DCI; and receiving, from the first BS, first data in a first resource region and a second resource region allocated based on the first DCI, and receiving, from the second BS, second data in the first resource region allocated based on the second DCI, wherein rate matching of resources related to a Demodulation Reference Signal (DMRS) is configured differently in the first resource region and the second resource region.

In another aspect, a method of transmitting data by a BS (BS) in wireless communication system, includes transmitting, a user equipment (UE), downlink control information (DCI), and transmitting, to the UE, the data in a resource region allocated for the data based on the DCI, wherein the resource region may include a first resource region used overlapping with another BS and a second resource region independently used by the BS, and rate matching of resources related to a Demodulation Reference Signal (DMRS) may be configured differently in the first resource region and the second resource region.

Also, in the method according to an embodiment of the present disclosure, the DMRS may include a first DMRS of the BS and a second DMRS of the another BS, and rate matching of resources related to the first DMRS and the second DMRS may be configured in the first resource region, and rate matching of resources only related to the first DMRS is configured in the second resource region.

Also, in the method according to an embodiment of the present disclosure, the DCI includes information related to the rate matching, and the information related to the rate matching is configured based on resource allocation information of the another BS.

Also, in the method according to an embodiment of the present disclosure, rate matching of a resource related to the second DMRS may be configured in only the first resource region based on the resource allocation information.

Also, in the method according to an embodiment of the present disclosure, puncturing may be performed instead of rate matching of a resource related to the second DMRS, in the first resource region.

In another aspect, a BS (BS) of transmitting data in a wireless communication system, includes one or more transceivers; one or more processors; and one or more memories that store instructions for operations executed by the one or more processors, and are connected to the one or more processors, wherein the operations include: transmitting, a user equipment (UE), downlink control information (DCI), and transmitting, to the UE, the data in a resource region allocated for the data based on the DCI, wherein the resource region includes a first resource region used overlapping with another BS and a second resource region independently used by the BS, and wherein rate matching of resources related to a Demodulation Reference Signal (DMRS) is configured differently in the first resource region and the second resource region.

In another aspect, a device includes one or more memories and one or more processors functionally connected to the one or more memories, wherein the one or more processors control the device to receive, from a first BS, first downlink control information (DCI), and receive, from a second BS, second DCI and receive, from the first BS, first data in a first resource region and a second resource region allocated based on the first DCI, and receive, from the second BS, second data in the first resource region allocated based on the second DCI, wherein rate matching of resources related to a Demodulation Reference Signal (DMRS) is configured differently in the first resource region and the second resource region.

In another aspect, one or more non-transitory computer-readable medium store one or more instructions, wherein the one or more instructions, which are executable by one or more processors, control a user equipment (UE) to receive, from a first BS, first downlink control information (DCI), and receive, from a second BS, second DCI and receive, from the first BS, first data in a first resource region and a second resource region allocated based on the first DCI, and receive, from the second BS, second data in the first resource region allocated based on the second DCI, wherein rate matching of resources related to a Demodulation Reference Signal (DMRS) is configured differently in the first resource region and the second resource region.

Advantageous Effects

According to an embodiment of the present disclosure, there is a technical effect of notifying a UE of an allocated resource of each BS without increasing overhead of DCI signaling, while maintaining the existing resource allocation field as it is.

In addition, according to an embodiment of the present disclosure, by setting rate matching or puncturing of resources related to DMRS differently in partially overlapped resources and non-overlapped resources, the loss of resources for data may be reduced and resource efficiency may be improved.

In addition, according to an embodiment of the present disclosure, in the case of performing joint transmission (e.g., CoMP transmission) through partially overlapped resource allocation, the base statin may accurately perform scheduling by receiving the proposed CSI. That is, a transmission rate of CoMP transmission may be improved through accurate MCS configuration and resource allocation based on the proposed method described above.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 is a flowchart illustrating an example CSI-related procedure.

FIG. 8 shows a signaling example of a method of performing joint transmission between a BS and a UE in a wireless communication system to which the method proposed in the present disclosure may be applied.

FIG. 9 shows an example of an operation flowchart of a UE receiving data in a wireless communication system to which the method proposed in the present disclosure may be applied.

FIG. 10 shows an example in which two BSs (e.g., TP1 and TP2) perform NCJT in a time-frequency resource region partially overlapped with a UE (e.g., UE1).

FIG. 11 shows another signaling example of a method of performing joint transmission between a BS and a UE in a wireless communication system to which the method proposed in the present disclosure may be applied.

FIG. 12 shows another example of an operation flowchart of a UE receiving data in a wireless communication system to which the method proposed in the present disclosure may be applied.

FIG. 13 shows a signaling example of a method of transmitting and receiving CSI between a BS and a UE in a wireless communication system to which the method proposed in the present disclosure may be applied.

FIG. 14 shows an example of an operation flowchart of a UE transmitting CSI in a wireless communication system to which the method proposed in the present disclosure may be applied.

FIG. 15 shows a signaling example of a method of transmitting and receiving CSI between a BS and a UE in a wireless communication system to which the method proposed in the present disclosure may be applied.

FIG. 16 shows an example of an operation flowchart of a UE transmitting CSI in a wireless communication system to which the method proposed in this disclosure may be applied.

FIG. 17 illustrates a communication system applied to the disclosure.

FIG. 18 illustrates a wireless device which may be applied to the disclosure.

FIG. 19 illustrates a signal processing circuit for a transmit signal.

FIG. 20 illustrates another example of a wireless device applied to the disclosure.

FIG. 21 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane.

Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10_3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{sym}^\mu$, and $N_{sym}^\mu$ is determined depending on a numerology used and slot configuration. The start of slots in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $N_{RB}^{max, \mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k, l̄), where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k, l) is used to refer to a resource element in a slot, where l=0, . . . , $N_{symb}^\mu-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indices p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Quasi-Co Location (QCL)

An antenna port is defined so that a channel in which symbols on an antenna port are carried is inferred from a channel in which other symbols on the same antenna port are carried. If the property of a channel in which symbols on one antenna port are carried may be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

"QCL-TypeA": {Doppler shift, Doppler spread, average delay, delay spread}
"QCL-TypeB": {Doppler shift, Doppler spread}
"QCL-TypeC": {Doppler shift, average delay}
"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a wireless channel (or referred to as a link) formed between the UE and the antenna port.

FIG. 7 is a flowchart showing an example of a CSI associated procedure.

Referring to FIG. 7, in order to perform one of usages of the CSI-RS, a terminal (e.g., user equipment (UE)) receives, from a base station (e.g., general Node B or gNB), configuration information related to the CSI through radio resource control (RRC) signaling (S710).

The configuration information related to the CSI may include at least one of CSI-interference management (IM) resource related information, CSI measurement configuration related information, CSI resource configuration related information, CSI-RS resource related information, or CSI reporting configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a non-zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 5 shows an example of NZP CSI-RS resource set IE. As shown in Table 5, parameters (e.g., a BM related "repetition" parameter and a tracking related "trs-Info" parameter) representing the usage may be configured for each NZP CSI-RS resource set.

TABLE 5

-- ASN1START
-- TAG-NZP-CSI-RS-RESOURCESET-START
NZP-CST-RS-ResourceSet ::= SEQUENCE {
   nzp-CSI-ResourceSetId   NU-CSI-RS-ResourceSetId,
   nzp-CSI-RS-Reources   SEQUENCE (SIZE (1..maxNrofNZP-CSI-RS-ReourcesPerSet)) OF NZP-CST-RS-ResourceId,
   repetition   ENUMERATED ( on, off )
   aperiodicTriggeringOffset   INTEGER(0..4)
   trs-Info   ENUMERATED (true)
   ...
}
-- TAG-NZP-CSI-RS-RESOURCESET-STOP
-- ASN1STOP In addition, the repetition parameter corresponding to the higher layer parameter corresponds to "CSI-RS-ResourceRep" of L1 parameter.

The CSI reporting configuration related information includes a reportConfigType parameter representing a time domain behavior and a reportQuantity parameter representing a CSI related quantity for reporting. The time domain behavior may be periodic, aperiodic, or semi-persistent.

The CSI reporting configuration related information may be expressed as CSI-ReportConfig IE and Table 6 below shows an example of CSI-ReportConfig IE.

TABLE 6

-- ASN1START
-- TAG-CSI-RESOURCECONFIG-START
CSI-ReportConfig ::= SEQUENCE {
   reportConfigId   CSI-ReportConfigId,
   carrier   ServCellIndex   OPTIONAL, - Need S
   resourcesForChannelMeasurement   CSI-ResourceConfigId,
   csi-IM-ResourcesForInterference   CSI-ResourceConfigId OPTIONAL, - Need R
   nzp-CSI-RS-ResourcesForInterference   CSI-ResourceConfigId OPTIONAL, - Need R
   reportConfigType   CHOICE {
      periodic   SEQUENCE {
         reportSlotConfig   CSI-ReportPeriodicityAndOffset,
         pucch-CSI-ResourceList   SEQUENCE (SIZE (1..maxNrofRWPs)) OF PUCCH-CSI-Resource
      },
      semiPersistentOnPUCCH   SEQUENCE {
         reportSlotConfig   CSI-ReportPeriodicityAndOffset,
         pucch-CSI-ResourceList   SEQUENCE (SIZE (1..maxNrofBWPs)) OF PUCCH-CSI-Resource
      },
      semiPersistentOnPUSCH   SEQUENCE {
         reportSlotConfig   ENUMERATED {s15, s110, s120, s140, s180, s1160, s1320},
         reportSlotOffsetList   SEQUENCE (SIZE (1.. maxNrofUL-Allocations)) OF INTEGER(0..32),
         p0alpha   P0-PUSCH-AlphaSetId
      },
      aperiodic   SEQUENCE ( TABLE 6-continued

```
        reportSlotOffsetList            SEQUENCE (SIZE (1..maxNrofUL-
Allocations)) OF INTEGER(0..32)
        }
    },
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCST          ENUMERATED {n2, n4}
OPTIONAL
        },
        cri-RI-CQI                      NULL,
        cri-RSRP                        NULL,
        ssb-Index-RSRP                  NULL,
        cri-RI-LI-PMI-CQI               NULL
    },
```

The UE measures CSI based on configuration information related to the CSI (S720). The CSI measurement may include (1) a CSI-RS reception process (S721) and (2) a process of computing the CSI through the received CSI-RS (S722). And, detailed descriptions thereof will be described later.

For the CSI-RS, resource element (RE) mapping is configured time and frequency domains by higher layer parameter CSI-RS-ResourceMapping.

Table 7 shows an example of CSI-RS-ResourceMapping IE.

TABLE 7

```
-- ANS1START
-- EAS-CSI-RS-RESOURCEMAPPING-START
CSI-RS-ResourceMapping ::=    SEQUENCE {
    frequenoyDomainAliocation     CHOICE {
        row1                          BIT STRING (SIZE (4)),
        row2                          BIT STRING (SIZE (12)),
        row4                          BIT STRING (SIZE (3)),
        other                         BIT STRING (SIZE (6))
    },
    nrofPorts                     ENUMERATED (p2,r2,p4,p8,p12,p16,p24,p32),
    firstOFDMSymoolInTimeDomain   INTEGER (0..13),
    firstOFDMSymbolInTimeDomain2  INTEGER (2..12)
    cdm-Type                      ENUMEARTED (noCDM, fd-CDM2, cdm4-
FD2-TD2, cdm8-FD2-TD4),
    density                       CHOICE {
        dot5                          ENUMERATED (evenPRBs, oddPRBs),
        one                           NULL,
        three                         NULL,
        spare                         NULL
    },
    freqBand                      CSI-FrequencyOccupation,
    ...
}
```

In Table 7, a density (D) represents a density of the CSI-RS resource measured in RE/port/physical resource block (PRB) and nrofPorts represents the number of antenna ports.

The UE reports the measured CSI to the eNB (S730).

Here, in the case where a quantity of CSI-ReportConfig of Table 7 is configured to "none (or No report)", the UE may skip the report.

However, even in the case where the quantity is configured to "none (or No report)", the UE may report the measured CSI to the eNB.

The case where the quantity is configured to "none (or No report)" is a case of triggering aperiodic TRS or a case where repetition is configured.

Here, only in a case where the repetition is configured to "ON", the UE may be skip the report.

CSI Reporting Configuration

The UE may calculate CSI parameters on the assumption of the following dependency between the CSI parameters. For example, LI may be calculated conditioned on the reported CQI, PMI, RI and CRI. For example, the CQI may be calculated based on the reported PMI, RI, and CRI. For example, the PMI may be calculated based on the reported RI and CRI. For example, the RI may be calculated based on a reported CRI.

Reporting configuration for CSI is aperiodic (using PUSCH), periodic (periodic) (using PUCCH), or semi-persistent (using PUCCH and DCI activated PUSCH). CSI-RS resources may be periodic, semi-persistent, or aperiodic. Table 8 shows supported combinations of CSI reporting configuration and CSI-RS resource configuration and how CSI reporting is triggered by each CSI-RS resource configuration. The periodic CSI-RS may be configured by a higher layer. The semi-persistent CSI-RS may be activated and deactivated. For aperiodic CSI-RS, trigger/activation may be configured.

TABLE 8

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command; for reporting on PUSCH, the UE receives triggering on DCI | Triggered by DCI; additionally, activation command possible |
| Semi-Persistent CSI-RS | Not Supported | For reporting on PUCCH, the UE receives an activation command; for reporting on PUSCH, the UE receives triggering on DCI | Triggered by DCI; additionally, activation command possible |
| Aperiodic CSI-RS | Not Supported | Not Supported | Triggered by DCI; additionally, activation command possible |

When the UE is set by the higher layer parameter NZP-CSI-RS-ResourceSet and the higher layer parameter repetition is set to 'off', the UE may determine the CRI among the supported sets of CRI values, and the number thereof may be reported in each CRI report. When the higher layer parameter repetition is set to 'on', CRI may not be reported. CRI may not be reported when the higher layer parameter codebookType is set to 'typeII' or 'typeII-PortSelection'.

For periodic or semi-continuous CSI reporting on PUCCH, periodicity (measured in slots) may be configured by a higher layer parameter reportSlotConfig.

For CSI reporting on semi-persistent or aperiodic PUSCH, the allowed slot offsets may be set by a higher layer parameter reportSlotOffsetList. The offset may be selected in activating/triggering DCI.

For CSI reporting, the UE may be configured through higher layer signaling of one of two available subband sizes. Here, the subband may be defined as $N_{PRB}^{SB}$ continuous PRBs, and a total number of PRBs in the BWP may be determined according to Table 9.

TABLE 9

| Bandwidth part (PRBs) | Subband size (PRBs) |
|---|---|
| <24 | N/A |
| 24-72 | 4, 8 |
| 73-144 | 8, 16 |
| 145-275 | 16, 32 | reportFreqConfiguration included in CSI-ReportConfig indicates frequency granularity of CSI reporting. In the CSI reporting setting configuration, a CSI reporting band may be defined as a subset of subbands of the BWP, and reportFreqConfiguration may indicate the following:

the csi-ReportingBand indicates a continuous or non-contiguous subset of subbands in the BWP for which CSI is to be reported. The UE does not expect to be configured as a CSI reporting band including subbands in which a reference signal and interference for a channel do not exist.

For wideband CQI or subband CQI reporting, it may be configured by a higher layer parameter cqi-FormatIndicator. When wideband CQI reporting is configured, wideband CQI may be reported for each codeword for the entire CSI reporting band. When subband CQI reporting is configured, one CQI for each codeword may be reported for each subband in the CSI reporting band.

For wideband PMI or subband PMI reporting, it may be configured by a higher layer parameter pmi-FormatIndicator. When wideband PMI reporting is configured, wideband PMI may be reported for the entire CSI reporting band. When subband PMI reporting is configured, a single wideband indication (i1) may be reported for the entire CSI reporting band, except for two antenna ports, and one subband indication (i2) may be reported for each subband of the CSI reporting band. When subband PMIS are configured with 2 antenna ports, PMI may be reported for each subband of the CSI reporting band.

CSI Reporting Setting may be said to have wideband frequency-granularity in the following case.

In a case where reportQuantity is set to 'cri-RI-PMI-CQI' or 'cri-RI-LI-PMI-CQI', cqi-FormatIndicator indicates single CQI report, and pmi-FormatIndicator indicates single PMI reporting, or In a case where reportQuantity is set to 'cri-RI-i1', or In a case where reportQuantity is set to 'cri-RI-CQI' or 'cri-RI-i1-CQI', and cqi-FormatIndicator indicates single CQI reporting, or In a case where reportQuantity is set to 'cri-RSRP' or 'ssb-Index-RSRP'

Except for the above cases, it may be said that the CSI Reporting Setting has subband frequency-granularity.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting "CSI-ResourceConfig" includes a configuration for S≥1 CSI resource set (given by higher layer parameter csi-RS-ResourceSetList). Here, the CSI resource setting corresponds to the CSI-RS-resource-setlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to "1" with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConFIG.

When the UE is configured as multiple CSI-ResourceConfigs including the same CSI-IM resource ID, the same time domain behavior is configured with respect to CSI-ResourceConFIG.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are "QCL-TypeD" for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConfig IE.

ii) SP CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. SP CSI reporting has activation/deactivation which is the same as or similar to a mechanism having data transmission on SPS PUSCH.

iii) aperiodic CSI reporting is performed on a PUSCH and triggered by DCI. In this case, information related to trigger of aperiodic CSI reporting may be transferred/instructed/configured through MAC-CE.

In the case of AP CSI having an AP CSI-RS, AP CSI-RS timing is set by RRC, and timing for AP CSI reporting is dynamically controlled by DCI.

The NR does not adopt a scheme (for example, transmitting RI, WB PMI/CQI, and SB PMI/CQI in order) of dividing and reporting the CSI in multiple reporting instances applied to PUCCH-based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. And, Z' represents a minimum CSI processing time from the reception of the CSI-RS for channel/interference to the execution of the CSI reporting.

Additionally, the UE reports the number of CSIs which may be simultaneously calculated.

Meanwhile, a technique of Coordinated Multi Point (CoMP) refers to a scheme in which a plurality of base stations exchange (e.g., use the X2 interface) or utilize channel information (e.g., RI/CQI/PMI/LI, etc.) fed back from the UE, coordinated transmission to the UE, to effectively control interference. According to a scheme of the CoMP operation, types of CoMP may be classified into Joint transmission (JT), Coordinated scheduling (CS), Coordinated beamforming (CB), dynamic point selection (DPS), dynamic point blanking (DPB), etc.

In addition, the BS described in this disclosure may be a generic term for an object that performs transmission and reception of data with the UE. For example, the BS described herein may be a concept including one or more transmission points (TPs), one or more transmission and reception points (TRPs), and the like.

As described above, when a plurality of BSs transmit/receive data (e.g., DL-SCH, PDSCH, etc.) with a UE, a non-coherent joint transmission (NCJT) method may be considered. Here, NCJT may refer to joint transmission that does not consider interference (i.e., does not have coherence). The NCJT may be a method in which a plurality of BSs (e.g., multiple TPs) transmit data to one UE using the same time resource and frequency resource. In this case, the BSs may transmit data to the UE through different layers using different demodulation reference signal (DMRS) ports.

The BS may transfer (or transmit) information for scheduling corresponding data to a UE receiving data or the like based on the NCJT scheme through downlink control information (DCI). In this case, a scheme in which each BS participating in the NCJT scheme transmits scheduling information for data it transmits through DCI may be referred to as a multi-DCI-based NCJT. In contrast, a scheme in which a representative BS transmits scheduling information for data transmitted by itself and data transmitted by other BS(s) among the BSs participating in the NCJT method through one DCI may be referred to as a single-DCI-based NCJT. Although the embodiments and methods described in this disclosure are mainly described based on the single-DCI-based NCJT, but they may also be extended and applied to the multi-DCI-based NCJT.

In addition, in relation to the joint transmission (e.g., NCJT) described above, a configuration and/or indication method may be different depending on the degree of overlap of time resources and/or frequency resources. As an example, an NCJT scheme in which time resources and frequency resources used by each BS for transmission completely overlap may be referred to as a fully overlapped NCJT scheme. In addition, an NCJT scheme in which time resources and/or frequency resources used by each BS for transmission are partially overlapped may be referred to as a partially overlapped NCJT scheme. This is only for convenience of description in the present disclosure, and the terms described above in the embodiments and methods to be described below may be replaced with other terms having the same technical meaning. As an example, in the case of partially overlapped NCJT, both data of a first BS (e.g., TP 1) and data of a second BS (e.g., TP 2) are transmitted in some time resources and/or frequency resources, and only data of any one of the first BS or the second BS may be transmitted in the other time resources and/or frequency resources.

Hereinafter, in the present disclosure, methods that may be proposed when considering the aforementioned joint transmission (e.g., NCJT) between a plurality of BSs (e.g., multiple TPs, multiple TRPs, etc.) and a UE in a wireless communication system will be described. Specifically, a method of configuring a resource allocation field, a method of identifying a resource allocation region (hereinafter, a first embodiment), a method of performing rate matching or puncturing on a partially overlapped resource region (hereinafter, a second embodiment), CSI calculation and/or reporting method in a case where portions of time resources and/or frequency resources are overlapped (hereinafter, a third embodiment), and CSI calculation and/or a reporting method (hereinafter, a fourth embodiment) in consideration of codewords classified according to whether time resources and/or frequency resources are overlapped will be described.

The embodiments described below are only classified for convenience of description, and do not limit the scope of the present disclosure. For example, some components of one embodiment may be substituted with some components of other embodiments or may be applied in combination with each other.

First Embodiment

First, a method of configuring a resource allocation (RA) field for scheduling and a method of identifying a resource allocation (RA) region when considering the aforementioned joint transmission (e.g., NCJT) between a plurality of BSs (e.g., multiple TPs, multiple TRPs, etc.) and a UE in a wireless communication system will be described. In this embodiment, it is assumed that single-DCI based NCJT supports a partially overlapped NCJT. In addition, the RA field may refer to a field included in DCI for scheduling data to be transmitted by the BS to the UE.

A time resource and/or a frequency resource for transmitting data for each BS participating in joint transmission (e.g., NCJT, CoMP, etc.) may be set differently. In this case, resource information corresponding to the union of time resources and/or frequency resources for each BS may be transmitted through the resource allocation field of DCI. Here, the resource information corresponding to the union may be referred to as a super-set of resource allocation information.

For example, a case where a first BS (e.g., TP 1, TRP 1, etc.) transmits data using a resource block RB {1, 2, 3, 4} and a second BS (e.g., TP 2, TRP 2, etc.) transmits data using RB {3, 4, 5, 6} is assumed. In this case, the first BS may instruct the UE by RB {1, 2, 3, 4, 5, 6} as an allocated resource through the resource allocation field included in DCI for scheduling data transmission.

The corresponding UE may receive information on the resource allocation field and recognize that data is transmitted (and/or to be transmitted) in RB {1, 2, 3, 4, 5, 6} therethrough. In addition, the UE may recognize that the first BS and the second BS transmit data in RB {1, 2, 3, 4, 5, 6} through joint transmission (e.g., NCJT) through QCL (quasi co-location) information defined in the transmission configuration indicator (TCI) field of the same DCI (e.g., the DCI) and DMRS port information (e.g., antenna port information) of the DMRS field. However, the corresponding UE may recognize which BS has transmitted data in which RB. In this case, a method in which the UE performs DMRS blind decoding on the RB allocated to each BS may be applied.

For example, DMRS information (e.g., transmission port index, rank, etc.) transmitted by the first BS and the second BS may be delivered to the UE through the DMRS information field in the same DCI. In this case, it is assumed that the first BS transmits port(s) belonging to the first DMRS group and the second BS transmits port(s) belonging to the second DMRS group. Here, the DMRS group may be referred to as a DMRS port group, a code division multiplexing (CDM) group, or the like. In this case, when DMRS ports {0, 1, 2, 3} are indicated by DCI, ports {0, 1} belong to the first DMRS group, and ports {2, 3} belong to the second DMRS group, the first BS may transmit port {0, 1} and the second BS may transmit port {2, 3}. Here, transmitting a port (e.g., an antenna port) may refer to transmitting DMRS through a corresponding port.

For each RB (or the smallest unit (e.g., resource block group (RBG)) available for resource allocation) of RB {1, 2, 3, 4, 5, 6} allocated by the resource allocation field, the corresponding UE may blind-decode the presence or absence of DMRS of port {0, 1} belonging to the first DMRS group and blind-decode the presence or absence of DMRS of port {2, 3} belonging to the second DMRS group. Blind decoding of the presence or absence of the DMRS by the UE may refer to that the UE generates a DMRS sequence corresponding to a DMRS port x and recognizes whether DMRS is present by power of a signal obtained by correlating the generated DMRS sequence and a signal received in a position of a resource element (RE) in which the DMRS port x is transmitted. That is, blind decoding of the presence or absence of the DMRS may refer to checking and determining whether there is a DMRS, that is, whether the BS transmits data or the like.

As an example, when the port {0, 1} is detected in the specific RB, the UE may determine that the first BS is performing data transmission in the corresponding RB, and when the port {2, 3} is detected in a specific RB, it may be determined that the second BS is performing data transmission in the corresponding RB. Through this, the UE may identify an RB of data transmitted by each BS and perform decoding on the corresponding data.

Here, when each BS transmits a different codeword (CW), the UE may perform data decoding on the assumption that the allocated RB(s) of the first BS is used for transmission of the first codeword and the allocated RB(s) of the second BS are used for transmission of the second codeword. That is, with the aforementioned proposed method, the UE may receive data corresponding to the i-th codeword by using the port(s) belonging to the i-th DMRS group in the RB(s) in which the i-th DMRS group is detected.

Alternatively, when each BS transmits the same codeword, a method in which each BS transmits a different code block group (CBG) may be considered. As an example, the UE may attempt data decoding on the assumption that the allocated RB of the first BS is used for transmission of a first CBG and the allocated RB of the second BS is used for transmission of a second CBG. That is, with the aforementioned proposed method, the UE may receive data corresponding to the i-th CBG by using the port(s) belonging to the i-th DMRS group in the RB(s) in which the i-th DMRS group is detected.

In addition, in relation to the aforementioned proposed method, the BS may instruct information on whether blind decoding for the DMRS port is required (and/or whether all layers corresponding to the signaled rank indicator (RI) in the scheduled RB set is transmitted) to the UE through DCI or the like. According to the corresponding instruction, the UE may perform blind decoding on the DMRS port in the manner described above or attempt data decoding on the assumption that all ports indicated by the BS are transmitted in the RB indicated by the resource allocation field as in the existing method.

Information on whether blind decoding for the DMRS port is required may be transmitted through a separate field in DCI. Alternatively, the corresponding information may be implicitly transmitted through QCL information transmitted through a transmission configuration indicator (TCI) field included in DCI. As an example, if a plurality of DMRS groups are configured and QCL information corresponding to each DMRS group is set differently, the UE may perform blind decoding on the DMRS port in the manner as described above on the assumption that joint transmission (e.g., NCJT) is performed. As a specific example, when a first CSI-RS is QCL-ed in the first DMRS group and a second CSI-RS is QCL-ed in the second DMRS group, the UE may perform blind decoding on the DMRS port as described above and perform data decoding.

In addition, the method described in this embodiment of the present disclosure may be extended and applied to a case where time allocation is different, as well as to the frequency allocation for each BS (e.g., TP, TRP, etc.). In this case, when DMRS ports indicated by DCI are all detected in the same OFDM symbol, the UE may assume that the first BS and the second BS commonly transmit data in all OFDM symbols allocated in time axis for data transmission. Otherwise, the UE may assume that an OFDM symbol in which both the first BS and the second BS transmit data and an OFDM symbol in which only one BS transmits data are mixed.

As an example, in the latter case, it is assumed that the port(s) corresponding to the first DMRS group is detected in a first OFDM symbol (OFDM symbol #1), the port(s) corresponding to a second DMRS group is detected in a 5th OFDM symbol (e.g., OFDM symbol #5), and resource allocation information on the time axis indicated by DCI includes information on 10 OFDM symbols (e.g., OFDM symbols #1 to #10). In this case, the UE may perform detection and decoding on data on the assumption that the first BS transmits data from the first OFDM symbol (corresponding DMRS port detection start time) to the 10th OFDM symbol and the second BS transmits data from the 5th OFDM symbol (corresponding DMRS port detection start time) to the tenth OFDM symbol.

The aforementioned methods have been described based on the case of two BSs, but this is only for convenience of description, and of course, the methods may be extended and applied to joint transmission between a plurality of BSs and UEs.

FIG. 8 shows a signaling example of a method of performing joint transmission between a BS and a UE in a wireless communication system to which the method proposed in the present disclosure may be applied. FIG. 8 is only for convenience of description and does not limit the scope of the present disclosure.

Referring to FIG. 8, it is assumed that the UE, the first BS, and the second BS perform joint transmission (e.g., NCJT), and a representative BS transmitting a single DCI is the first BS.

The UE may receive a DCI for scheduling data transmission (via the PDCCH) from the first BS (S805). Similarly, the first BS may transmit DCI for scheduling data transmission to the UE. Here, the DCI may include scheduling information for the first data to be transmitted by the first BS and the second data to be transmitted by the second BS.

For example, the DCI may include resource allocation information and DMRS-related information for the first data and the second data. Here, the resource allocation information may include a union RB {1, 2, 3, 4, 5, 6}) of a first allocated resource (e.g., RB {1, 2, 3, 4}) and a second allocated resource (e.g., RB {3, 4, 5, 6}). In addition, the DMRS information may include a first DMRS port group (e.g., port {0, 1}) to which one or more ports for the first BS belong and a second DMRS port group (e.g. Port {2, 3}) to which one or more ports for the second BS belong. For example, the first BS may encode the resource allocation field as a union of the allocated resource of the first BS and the allocated resource of the second BS. In addition, the first BS may encode a QCL set and/or a DMRS port corresponding to each BS through a corresponding DCI field.

For example, the operation in which the UE (e.g., 100/200 of FIGS. 17 to 21) in step S805 described above receives the DCI from the BS (e.g., 100/200 of FIGS. 17 to 21) may be implemented by the apparatus of FIGS. 17 to 21 to be described. For example, referring to FIG. 18, one or more processors 102 may control one or more transceivers 106 and/or one or more memories 104 to receive the DCI, and the one or more transceivers 106 may receive the DCI. Similarly, the operation in which the BS (e.g., 100/200 in FIGS. 17 to 21) of the aforementioned step S805 transmits the DCI to the UE (e.g., 100/200 in FIGS. 17 to 21) may be implemented by the apparatus of FIGS. 17 to 21 to be described below. For example, referring to FIG. 18, one or more processors 102 may control one or more transceivers 106 and/or one or more memories 104 to transmit the DCI, and the one or more transceivers 106 may transmit the DCI.

The UE may receive the first data and the second data from the BSs, that is, the first BS and the second BS, respectively (S810). Similarly, the first BS and the second BS may transmit the first data and the second data to the UE, respectively.

For example, the operation in which the UE (e.g., 100/200 in FIGS. 17 to 21) of the aforementioned step S810 receives data (i.e., first data and the second data) from the BS (100/200 of FIGS. 17 to 21) may be implemented by the apparatus of FIGS. 17 to 21 to be described below. For example, referring to FIG. 18, one or more processors 102 may control one or more transceivers 106 and/or one or more memories 104, etc. to receive the data, and one or more transceivers 106 may receive the data. Similarly, the operation in which the BS (e.g., 100/200 in FIGS. 17 to 21) of the aforementioned step S810 transmits data (i.e., the first data and the second data to the UE (e.g., 100/200 in FIGS. 17 to 21) may be implemented by the apparatus of FIGS. 17 to 21 to be described below. For example, referring to FIG. 18, one or more processors 102 may control one or more transceivers 106 and/or one or more memories 104 to transmit the data, and one or more transceivers 106 may transmit the data.

The UE (e.g., 100/200 of FIGS. 17 to 21) may perform decoding on the first data and the second data based on the aforementioned proposed method (S815). In this case, the first data and the second data may be decoded, respectively, based on the first allocated resource and the second allocated resource determined using the resource allocation information and the DMRS information.

For example, as in the aforementioned proposed method, the UE may perform an operation of identifying (e.g., a blind decoding operation on the DMRS port described above) whether DMRS of the first DMRS port group and the DMRS of the second DMRS port group are transmitted for the resources included in the resource allocation information. Here, when the first allocated resource through which the DMRS of the first DMRS port group is transmitted is determined, the first data may be decoded in the first allocated resource, and the second allocated resource through which the DMRS of the second DMRS port group is transmitted is determined, the second data may be decoded in the second allocated resource.

For example, the operation in which the UE (e.g., 100/200 in FIGS. 17 to 21) of the aforementioned step S815 performs decoding on data (i.e., the first data and the second data) may be implemented by the apparatus of FIGS. 17 to 21. For example, referring to FIG. 18, one or more processors 102 may control one or more transceivers 106 and/or one or more memories 104 to perform decoding on the data.

In addition, as in the aforementioned proposed method, the UE may receive information indicating an operation of identifying whether the DMRS of the first DMRS port group and the DMRS of the second DMRS port group are transmitted from the first BS through the DCI. For example, the information may be indicated based on a mapping relation between quasi co-location (QCL) information of a transmission configuration indicator (TCI) field included in the DCI and the DMRS information.

In addition, as in the aforementioned proposed method, when the codeword of the first data is the same as the codeword of the second data, the first allocated resource may be used for transmission of a first code block group and the second allocated resource may be used for transmission of a second code block group.

FIG. 9 shows an example of an operation flowchart of a UE receiving data in a wireless communication system to which the method proposed in the present disclosure may be applied. FIG. 9 is only for convenience of description and does not limit the scope of the present disclosure.

Referring to FIG. 9, it is assumed that FIG. 9 is an example of an operation flowchart according to the operation of the UE in FIG. 8 described above. Accordingly, in the detailed description of each operation, the content overlapping with the content described in FIG. 8 will be omitted from the description of FIG. 9.

The UE (e.g., 100/200 in FIGS. 17 to 21) may receive DCI from the first BS (e.g., 100/200 in FIGS. 17 to 21) (S905). The DCI may be for scheduling the first data and the second data to be transmitted by the first BS and the second BS, respectively. For example, the DCI may include resource allocation information and DMRS-related information for the first data and the second data.

Based on the DCI, the UE (e.g., 100/200 in FIGS. 17 to 21) may receive first data and second data from the first BS and the second BS (e.g., 100/200 of FIGS. 17 to 21) (S910). Decoding of the first data and the second data may be performed based on blind decoding for the DMRS port for the resources (e.g., RBs) indicated by the DCI as in the aforementioned proposed method.

As an example, when the number of QCL sets and DMRS port groups is plural, the UE may assume joint transmission (e.g., NJCT). In this case, a super-set of allocated resources may be determined (or identified) through the resource allocation field of the DCI. Thereafter, the UE may perform a blind decoding operation for port(s) belonging to DMRS groups for each physical resource block group (PRG) and/or RB. Through this, the UE may determine (or identify) the PRG and/or RB in which the first DMRS group is detected as the allocated resource of the first BS, and may decode the first data (e.g., data corresponding to the first codeword) in the allocated resource. In addition, the UE may determine (or identify) the PRG and/or RB in which the second DMRS group is detected as the allocated resource of the second BS, and decode the second data (e.g., data corresponding to the second codeword) in the allocated resource.

The use of the method proposed in this embodiment of the present disclosure described above may obtain a technical effect of notifying a UE of an allocated resource of each BS without increasing overhead of DCI signaling, while maintaining the existing resource allocation field as it is.

Second Embodiment

Next, a method of performing rate matching or puncturing in resource related to DMRS when considering joint transmission (e.g., NCJT) between a plurality of BSs (e.g., multiple TPs, multiple TRPs, etc.) and a UE described above in a wireless communication system will be described.

As described above, a time resource and/or a frequency resource for transmitting data for each BS participating in joint transmission may be set differently/independently. In performing NCJT, there are NCJT in which time-frequency resources are fully overlapped (fully overlapped) and NCJT in which time-frequency resources are partially overlapped. In the case of partially overlapped NCJT, in some time-frequency resources, both the first BS (e.g., TP1, TRP1) and the second BS (TP2, TRP2) transmit data, and only one of the second BSs (e.g., TP2, TRP2) transmits data in the remaining time frequency resources.

In this embodiment, it is assumed that partially overlapped NCJT is supported. In this embodiment of the present disclosure, although the description is based on a case where frequency resources overlap, the methods described below may be extended and applied to a case where time resources are overlapped and to a case where time resources and frequency resources are overlapped.

In this embodiment of the present disclosure multiple DCI-based NCJT operations is assumed. However, this is only for convenience of description and does not limit the technical scope of the present disclosure. Therefore, even a single DCI-based NCJT operation may also be applied to a case where resource allocation information for each BS, DMRS information, and the like are set differently.

In multiple DCI-based NCJTs, each BS may transmit each DCI including scheduling information to the UE. Specifically, resource allocation information of time resources and/or frequency resources for each BS may be transferred to the UE through a resource allocation field of downlink control information (DCI). In addition, the DCI may include quasi co-location (QCL) information defined in a transmission configuration indicator (TCI) field and DMRS information of a DMRS information field. The DMRS information may include DMRS port information (e.g., an antenna port index), a rank, and the like. The DMRS information (e.g., a transmission port index, a rank, etc.) may be transferred to each UE through the DMRS information field of the DCI transmitted by each BS. By receiving the DCI, the UE may recognize a resource through which data is transmitted, whether the first BS and the second BS transmit data through joint transmission (e.g., NCJT).

FIG. 10 is an example in which two BSs (e.g., TP1, TP2) perform NCJT on a UE (e.g., UE1) in a partially overlapped time-frequency resource region. FIG. 10 is for convenience of description and does not limit the scope of the present disclosure. The number of resources constituting RB group A and RB group B shown in FIG. 10 is an example, and each RB group may include a different number of resources from that shown in FIG. 10.

Referring to FIG. 10, a first BS (e.g., TP1, TRP1) may transmit data (e.g., PDSCH1) to a first UE (e.g., UE1) through RB group A and RB group B. A second BS (e.g., TP2, TRP2) may transmit data (e.g., PDSCH2) to the first UE (e.g., UE1) through RB group A and transmit data (e.g., PDSCH3) to a second UE (e.g., UE2) through RB group B. In other words, the first UE (e.g., UE1) may receive data (e.g., PDSCH1 and PDSCH2) from the first and second BSs in the NCJT manner in RB group A, receive data (e.g., PDSCH1) from the first BS in RB group B, and may receive inter-cell interference (ICI) from the second BS.

As shown in FIG. 10, a time-frequency resource in which data is received may be divided into a partially overlapped region (i.e., a region in which NCJT is performed) and a non-overlapped region (i.e., a region for receiving data from one TP). For example, the partially overlapped resource region may be represented by RB group A (i.e., RBG A), and the non-overlapped resource region may be represented by RB group B (i.e., RBG B). The RB group A (i.e., RBG A) and the RB group B (i.e., RBG B) are concepts differentiated from resource block group (RBG) of the NR standard. Hereinafter, unless otherwise specified, RBG may refer to an RB group divided into a partially overlapped resource region in which NCJT is performed and a non-overlapped resource region in which data is transmitted by a single BS. The RBG of the conventional NR standard will be expressed separately as a legacy RBG or an RBG of the NR standard.

In FIG. 10, the first BS (e.g., TP1) may transmit the first DMRS (e.g., DMRS1) (DMRS for channel estimation of PDSCH 1) to the first UE (e.g., UE1) through a first DMRS code division multiplexing (CDM) group and may transmit the second DMRS (e.g., DMRS2) (DMRS for channel estimation of PDSCH2) to the first UE (e.g., UE1) through a second DMRS (e.g., DMRS2) (DMRS for channel estimation of PDSCH 2) through a second DMRS CDM group. The first UE (e.g., UE1) may estimate a channel without interference between two DMRSs (i.e., DMRS1 and DMRS2).

Here, the DMRS CDM group may mean a DMRS-related resource (e.g., a time-frequency resource, a transmit antenna port, etc.), and may also be referred to as a DMRS group, a DMRS port group, and the like. In addition, transmitting the DMRS may mean transmitting the DMRS through a DMRS port (e.g., an antenna port) and may be expressed as transmitting the DMRS port. In addition, transmitting the DMRS through the DMRS CDM group may mean transmitting the DMRS through a resource related to DMRS transmission.

Here, the BS operating as the NCJT may instruct the UE to perform rate matching for resources related to DMRS transmitted by another BS when the UE receives data, in order to eliminate interference between the data that the BS transmits and the DMRS transmitted by other BSs.

Referring to FIG. 10, in order to eliminate interference between the data (e.g., PDSCH1) transmitted by the first BS and the DMRS (e.g., DMRS2) transmitted by the second BS, the BS instructs the UE to perform rate matching in the first DMRS CDM group and the second DMRS CDM group (by using DCI1 which is DCI of PDSCH1) when the PDSCH1 is received. Also, the BS instructs the UE to perform rate matching in the first DMRS CDM group and the second DMRS CDM group when PDSCH2 is received. According to the current specification, since rate matching for DMRS is equally applied to the entire resource block of PDSCH1, rate matching is performed in the second DMRS CDM group even in a non-overlapped resource region (e.g., RB group B), as well as the overlapped resource region (e.g., RB group A).

However, such rate matching may result in waste of data transmission resources. Because RB group B is a non-overlapped RB, PDSCH1 does not need to be rate matching for the second DMRS CDM group in RB group B. The second BS (e.g., TP2) may transmit the DMRS of the second UE (e.g., UE2) to the second DMRS CDM group in RB group B, but from the perspective of the first UE (e.g., UE1), there is no need to rate-match PDSCH1 in the position of the second DMRS CDM group of RB group B because there is no need to estimate the channel of the second UE (e.g., UE2).

In order to prevent a waste of resources due to unnecessary rate matching, a method of performing rate matching in a resource related to the DMRS according to whether resources are overlapped in the partially overlapped NCJT operation is proposed. Hereinafter, through the method proposed in this embodiment of the present disclosure, in non-overlapped resources, rate matching for a resource related to a DMRS transmitted by another BS is not performed, and data may be transmitted/received instead.

Each BS (e.g., TP1, TP2) may transmit DCI (e.g., DCI1, DCI2) to the UE, respectively. The DCI may include rate matching information for resources related to DMRS transmitted by each BS. For example, the first BS instructs rate matching for the CDM (e.g., the first DMRS CDM group) group of DMRS1 through DCI1 scheduling PDSCH1, and the second BS may instruct rate matching for a CDM group (e.g., the second DMRS CDM group) of DMRS2 through DCI2 scheduling PDSCH2.

Here, since the BSs share scheduling information for data transmitted by other BSs is through backhaul, rate matching may be set/instructed in consideration of scheduling information (e.g., resource allocation information) of other BSs.

For example, since the first BS (e.g., TP1) and the second BS (e.g., TP2) share scheduling information (e.g., resource allocation information) for PDSCH1 and PDSCH2 with each other, when the first BS (e.g., TP1) transmits PDSCH1, the first BS may perform rate matching on the DMRS CDM group (e.g., the first DMRS CDM group) indicated through DCI1 as usual and the second BS (e.g., TP2) may perform rate matching only on the RB group A (i.e., overlapped RB) for DMRS CDM group (e.g., second DMRS CDM group) indicated by the second BS through the DCI 2. In other words, the first BS performs rate matching for DMRS CDM groups indicated through DCI1 and DCI2 in RB group A, and performs rate matching for DMRS CDM groups indicated through DCI1 in RB group B to transmit PDSCH1.

In the aforementioned proposed method, when the UE (e.g., UE1) does not receive some of DCIs transmitted by a plurality of BSs performing NCJT (e.g., when the UE does not receive DCI2), UE1 cannot properly perform rate matching of the PDSCH1, and thus, decoding will fail. In order to enable decoding of PDSCH1 even if some DCI (e.g., DCI2) is not received, a method of performing puncturing, instead of performing rate matching of the PDSCH1, in the overlapped resource region (e.g., RB group A) for the CDM group indicated through DCI2 may also be considered.

For example, the first BS may perform rate matching for DMRS CDM groups indicated through DCI1 and puncturing on the DMRS CDM groups indicated through DCI2 in RB group A and transmits the PDSCH1 by performing rate matching for DMRS CDM groups indicated through DCI1 in the RB group B.

The UE may recognize a resource in which data is received based on DCI. Since the UE may distinguish between a resource region in which NCH is performed and a resource region in which a single BS operates, the UE may perform rate matching based on whether or not resources overlap and decode.

For example, after decoding both DCI1 and DCI2, UE1 may recognize an overlapped resource region (e.g., RB group A) and a non-overlapped resource region (e.g., RB group B). For RB group A, rate matching may be performed in the resource (e.g., RE) of the CDM group (e.g., the first DMRS CDM group) indicated through DCI1, and rate matching may be performed in the resource (e.g., RE) of the CDM group (e.g., second DMRS CDM group) indicated through DCI2. For RB group B, rate matching may be performed only in the resource (e.g., RE) of the CDM group indicated through DCI1. That is, the UE1 may perform rate matching indicated through DCI1 as usual when PDSCH1 is received, and perform rate matching indicated through DCI2 only for the overlapped RB.

Alternatively, rate matching information for the entire DMRS CDM group may be transmitted using one of a plurality of DCIs. For example, rate matching for both the first DMRS CDM group and the second DMRS CDM group may be indicated/configured through DCI1. In this case, for the second CDM group to which the reception DMRS port of PDSCH1 does not belong, the BS and the UE may agree to perform rate matching or puncturing only in an overlapped resource region (e.g., RB group A).

As described above, after decoding both DCI1 and DCI2, UE1 may recognize an overlapped resource region (e.g., RB group A) and a non-overlapped resource region (e.g., RB group B). For PDSCH1, the UE1 may perform rate matching on the first DMRS CDM group and the second DMRS CDM group in the overlapped resource region (e.g., RB group A) and perform rate matching in the first CMRS CDM group in the non-overlapped resource region (e.g., RB group B).

The method described in this embodiment of the present disclosure may be extended and applied to a case in which time allocation is different, as well as for frequency allocation for each BS (e.g., TP, TRP, etc.). In this case, when DMRS ports indicated by DCI are all detected in the same orthogonal frequency division multiplexing (OFDM) symbol, the UE may assume that the first BS and the second BS transmit data commonly in all OFDM symbols allocated in the time axis for data transmission. Otherwise, the UE may assume that an OFDM symbol in which both the first BS and the second BS transmit data and an OFDM symbol in which only one BS transmits data are mixed.

The aforementioned methods have been described based on the case of two BSs, but this is only for convenience of description, and of course, the methods may be extended and applied to joint transmission between a plurality of BSs and UEs.

FIG. 11 shows a signaling example of a method of performing joint transmission between a BS and a UE in a wireless communication system to which the method proposed in the present disclosure may be applied. FIG. 11 is only for convenience of description and does not limit the scope of the present disclosure.

Referring to FIG. 11, a case where the UE and the first BS and the second BS perform joint transmission (e.g., NCJT), and resources allocated by the first BS and resources allocated by the second BS are partially overlapped is assumed. That is, a partially overlapped NCJT operation is assumed. In addition, in FIG. 11, the BS may be replaced with terms such as TRP or panel.

The UE (e.g., 100/200 of FIGS. 17 to 21) may receive first downlink control information (DCI) from the first BS (e.g., 100/200 of FIGS. 17 to 21) and (S1105-1), and may receive second downlink control information (DCI) from the second BS (e.g., 100/200 in FIGS. 17 to 21) (S1105-2). The DCI (e.g., first DCI, second DCI) may include resource allocation information, DMRS-related information, QCL information, or rate matching information for data (e.g., first data, second data, etc.) to be transmitted by each BS. The DCI may be received through a PDCCH.

For example, the first DCI may include resource allocation information for the first data, and the second DCI may include resource allocation information for the second data. For example, a first resource region and a second resource region may be allocated based on the first DCI, and the first resource region may be allocated based on the second DCI. Based on the received DCI, the UE may know an overlapped resource region (e.g., a first resource region) in which both the first BS and the second BS transmit data and non-overlapped resource region in which one of the first BS or the second BS performs data transmission.

For example, the DMRS-related information may include DMRS port information (e.g., antenna port index), a rank, and the like. For example, the DMRS-related information may include a first DMRS port group (e.g., port {0, 1}) to which one or more ports for the first BS belong and a second DMRS port group (e.g., port {2, 3}) to which one or more ports for the second BS belong. The first DCI may include information related to the first DMRS, and the second DCI may include information related to the second DMRS. Alternatively, both the information related to the first DMRS and the information related to the second DMRS may be included in one of the first DCI and the second DCI. Here, the first DMRS may be a DMRS transmitted by the first BS, and the second DMRS may be a DMRS transmitted by the second BS.

For example, the rate matching information may be rate matching information of a resource related to DMRS, and rate matching of resource related to DMRS in a first resource region in which first data and second data are received together and rate matching or resource related to DMRS in the second resource region in which only one of the first data or the second data is received may be set differently/independently.

For example, the first BS and the second BS may be connected to a backhaul so that scheduling information for a counterpart BS may be known. Each BS may set rate matching in consideration of scheduling information (e.g., resource allocation information) of other BSs. That is, each BS may set rate matching in consideration of (based on) resources allocated by other BSs for data transmission. For example, the rate matching information included in the first DCI may be set in consideration of scheduling information for the second data of the second BS (e.g., a first resource region allocated for the second data by the second BS).

As a specific example, both the first resource region and the second resource region may be allocated by the first DCI, and the first resource region may be allocated by the second DCI. In the first resource region, rate matching may be configured for a DMRS-related resource based on each rate matching information of the first DCI and the second DCI. In the second resource region, rate matching may be configured for a DMRS-related resource based on rate matching information of the first DCI. In other words, rate matching of resources related to the first DMRS and the second DMRS may be configured in the first resource region, and rate matching may be configured only for resources related to the first DMRS in the second resource region. That is, based on scheduling information (e.g., resource allocation information), rate matching of resources related to the second DMRS may be set only in the first resource region.

As another specific example, rate matching of resource related to the first DMRS and puncturing of resource related to the second DMRS are configured in the first resource region, and rate matching may be configured for only resource related to the first DMRS in the second resource region.

For example, the rate matching information may be rate matching information of resource related to the entire DMRS (e.g., the first DMRS and the second DMRS). That is, rate matching of resources related to the entire DMRS may be indicated/configured using one of a plurality of DCIs. The UE may be configured/predefined to perform rate matching or puncturing only in an overlapped resource region for a DMRS-related resource that does not include a DMRS port associated with data reception.

For example, an operation in which the UE (e.g., 100/200 in FIGS. 17 to 21) in the aforementioned S1105 (i.e., S1105-1/S1105-2) receives the first DCI from the first BS (e.g., 100/200 in FIGS. 17 to 21) and receives the second DCI from the second BS (e.g., 100/200 in FIGS. 17 to 21) may be implemented by the apparatus of FIGS. 17 to 21 to be described below. For example, referring to FIG. 18, one or more processors 102 may control one or more transceivers 106 and/or one or more memories 104 to receive the first DCI and the second DCI, and the one or more transceivers 106 may receive the first DCI and the second DCI.

Similarly, an operation in which the first BS (e.g., 100/200 in FIGS. 17 to 21) in the aforementioned S1105 (i.e., S1105-1/S1105-2) transmits the first DCI to the UE (e.g., 100/200 in FIGS. 17 to 21) and the second BS (e.g., 100/200 in FIGS. 17 to 21) transmits the second DCI to the UE (e.g., 100/200 in FIGS. 17 to 21) may be implemented by the apparatus of FIGS. 17 to 21 to be described below. For example, referring to FIG. 18, one or more processors 102 may control one or more transceivers 106 and/or one or more memories 104 to transmit the first DCI or the second DCI, and the one or more transceivers 106 may transmit the first DCI or the second DCI.

The UE (e.g., 100/200 in FIGS. 17 to 21) may receive the first data from the first BS (e.g., 100/200 in FIGS. 17 to 21) (S1110-1) and receive the second data from the second BS (e.g., 100/200 of FIGS. 17 to 21) (S1110-2). Similarly, the first BS and the second BS (e.g., 100/200 in FIGS. 17 to 21) may transmit the first data and the second data to the UE (e.g., 100/200 in FIGS. 17 to 21), respectively.

For example, the first data may be received in a first resource region and a second resource region allocated based on the first DCI, and the second data may be received based on the second DCI. That is, the first resource region may be an overlapped resource region in which first data and second data are received, and the second resource region may be a non-overlapped resource region in which first data is received.

For example, the operation in which the UE (e.g., 100/200 in FIGS. 17 to 21) in the aforementioned S1110 (i.e., S1110-1/S1110-2) receives data (i.e., the first data and the second data) from the BS (e.g., 100/200 in FIGS. 17 to 21) may be implemented by the apparatus of FIGS. 17 to 21, which will be described below. For example, referring to FIG. 18, one or more processors 102 may control one or more transceivers 106 and/or one or more memories 104, etc. to receive the data, and one or more transceivers 106 may receive the data. Similarly, the operation in which the BS (e.g., 100/200 in FIGS. 17 to 21) in the aforementioned S1110 (i.e., S1110-1/S1110-2) step transmits data (i.e., the first data and the second data) to the UE (e.g., 100/200 in FIGS. 17 to 21) may be implemented by the apparatus of FIGS. 17 to 21 to be described below. For example, referring to FIG. 18, one or more processors 102 may control one or more transceivers 106 and/or one or more memories 104 to transmit the data, and one or more transceivers 106 may transmit the data.

The UE (e.g., 100/200 of FIGS. 17 to 21) may perform decoding on the first data and the second data based on the aforementioned proposed method (S1115). In this case, the first data and the second data may be decoded based on the resource allocation information, the DMRS-related information, the rate matching information, and the like.

For example, as in the aforementioned proposed method, the UE may perform rate matching on the first data and the second data in a DMRS-related resource for decoding. For example, the first data may be decoded by performing rate matching on the resource for the first DMRS and the second DMRS in an overlapped resource region (e.g., a first resource region) and by performing rate matching on the resource for the first DMRS in a non-overlapped resource region (e.g., a second resource region). As another example, the first data may be decoded by performing rate matching on the resource for the first DMRS and puncturing on the resource for the second DMRS in the overlapped resource region (e.g., the first resource region) and by performing rate matching on the resource for the first DMRS in the non-overlapped resource region (e.g., the second resource region).

For example, the operation in which the UE (e.g., 100/200 in FIGS. 17 to 21) of the aforementioned step S1115 performs decoding on data (i.e., the first data and the second data) may be implemented by the apparatus of FIGS. 17 to 21 to be described below. For example, referring to FIG. 18, one or more processors 102 may control one or more transceivers 106 and/or one or more memories 104 to perform decoding on the data.

FIG. 12 shows an example of an operation flowchart of a UE receiving data in a wireless communication system to which the method proposed in the present disclosure may be applied. FIG. 12 is only for convenience of description and does not limit the scope of the present disclosure.

Referring to FIG. 12, it is assumed that FIG. 12 is an example of an operation flowchart according to the operation of the UE in FIG. 11 described above. Thus, in the detailed description of each operation, the content overlapping with the content described in FIG. 11 will be omitted from the description of FIG. 12. In addition, in FIG. 12, the BS may be replaced with terms such as TRP or panel.

The UE (e.g., 100/200 in FIGS. 17 to 21) may receive first downlink control information (DCI) from the first BS (e.g., 100/200 in FIGS. 17 to 21) and may receive second downlink control information (DCI) from the second BS (e.g., 100/200 in FIGS. 17 to 21) (S1205).

As an example, each of the first DCI and the second DCI may include resource allocation information for data to be transmitted by each BS (e.g., first data, second data, etc.), and the first resource region and the second resource region may be allocated based on the first DCI, and the first resource region may be allocated based on the second DCI. That is, the first resource region may be an overlapped resource region in which both the first BS and the second BS transmit data, and the second resource region may be a non-overlapped resource region in which the first BS transmits data.

As an example, each of the first DCI and the second DCI may include information related to rate matching. The rate matching-related information may be related to rate matching of resources related to DMRS (e.g., first DMRS, second DMRS) in a resource region (e.g., first resource region, second resource region) in which data is to be received. As an example, the rate matching of DMRS-related resources in the overlapped resource region (e.g., the first resource region) and the rate matching of the DMRS-related resources in the non-overlapped resource region (e.g., the second resource region) may be set different/independently. For example, rate matching may be set for resources related to the first DMRS and the second DMRS in the first resource region, and rate matching may be set only for resources related to the first DMRS in the second resource region.

The UE (e.g., 100/200 in FIGS. 17 to 21) may receive first data from the first BS (e.g., 100/200 in FIGS. 17 to 21) and receive second data from the second BS (e.g., 100/200 in FIGS. 17 to 21) (S1210).

In an example, the first data may be received in the first resource region and the second resource region allocated based on the first DCI, and the second data may be received in the first resource region allocated based on the second DCI.

The use of the proposed method in this embodiment of the present disclosure described above may obtain a technical effect of reducing unnecessary rate matching or puncturing and using resources for data transmission.

Third Embodiment

Next, a method of calculating and/or reporting CSI in a case where some time resources and/or frequency resources are overlapped (e.g., the partially overlapped NCJT described above) when the aforementioned joint transmission (e.g., NCJT) between a plurality of BSs (e.g., multiple TPs, multiple TRPs, etc.) and a UE in a wireless communication system will be described.

In this embodiment of the present disclosure, the description is based on a case where frequency resources are overlapped, but the methods described below may also be extended and applied to a case where time resources are overlapped and a case where time resources and frequency resources are overlapped. In addition, in this embodiment, IMR refers to an interference measurement resource, CMR refers to a channel measurement resource, FB refers to feedback, SB refers to a subband, WB refers to a wideband, and CW refers to a codeword.

In the overlapped RB, inter-layer interference between BSs occurs, but in the non-overlapped RB, inter-layer interference does not occur between the BSs. Therefore, the PMI and CQI of the overlapped RBs need to be different from the PMI and CQI of the non-overlapped RBs. To this end, the UE may need to report the CSI of the following three methods.

Method 1) SB CSI Report Assuming that Only the First BS (e.g., TP 1) Transmits Data For convenience of description, the CSI report corresponding to method 1) may be referred to as "CSI 1" for convenience of description below.

Table 10 shows an example of SB CSI reporting for a case where there are a total of three SBs.

TABLE 10

| SB | BS | CW | PDSCH | PMI FB | RI FB | SINR | CMR | IMR | CQI FB |
|---|---|---|---|---|---|---|---|---|---|
| 1 | 1 | 1 | 1 | SB PMI | RI 1 | SINR 1 | CSI-RS 1 | IMR | SB CQI |
| 2 | 1 | | | SB PMI | | SINR 2 | CSI-RS 1 | IMR | SB CQI |
| 3 | 1 | | | SB PMI | | SINR 3 | CSI-RS 1 | IMR | SB CQI |

Referring to Table 10, the UE may report the PMI and CQI for each SB. Each row in Table 10 may indicate CSI corresponding to each SB. For example, the SB PMI and SB CQI of a first column (i.e., SB 1) may refer to reporting on the first SB among the three SBs, and in the case of RI, the UE may report common WB RI (i.e., RI 1) without classification of SBs.

Since it is assumed that the BS participating in data transmission in each SB is only the first BS, the UE may perform channel measurement using a CMR (e.g., CSI-RS 1) transmitted by the first BS when calculating CSI, and perform interference measurement through IMR. In addition, in the case of RI, the UE may report only one optimal value for WB to the BS. In addition, in the case of NCJT, the number of transmission codewords of each BS may be limited to 1, and when the UE calculates CSI 1, the number of codewords may be assumed to be 1.

Method 2) SB CSI Reporting Assuming that Only the Second BS (e.g., TP 2) Transmits Data For convenience of description, the CSI report corresponding to method 2) may be referred to as "CSI 2" for convenience of description below.

Table 11 shows an example of SB CSI reporting for a case where there are a total of three SBs.

TABLE 11

| SB | BS | CW | PDSCH | PMI FB | RI FB | SINR | CMR | IMR | CQI FB |
|---|---|---|---|---|---|---|---|---|---|
| 1 | 2 | 1 | 1 | SB PMI | RI 2 | SINR 1 | CSI-RS 2 | IMR | SB CQI |
| 2 | 2 | | | SB PMI | | SINR 2 | CSI-RS 2 | IMR | SB CQI |
| 3 | 2 | | | SB PMI | | SINR 3 | CSI-RS 2 | IMR | SB CQI |

Referring to Table 11, the UE may report the PMI and CQI for each SB. Each row in Table 11 may indicate CSI corresponding to each SB. For example, the SB PMI and SB CQI of the first column (i.e., SB 1) may refer to reporting on the first SB among the three SBs, and in the case of RI, the UE may report a common WB RI (i.e., RI) without classification of SBs.

Since it is assumed that only the BS participating in data transmission in each SB is the second BS, the UE may perform channel measurement using CMR (e.g., CSI-RS 2) transmitted by the second BS when calculating CSI and perform interference measurement through IMR. In addition, in the case of RI, the UE may report only one optimal value for WB to the BS. In addition, in the case of NCJT, the number of transmission codewords of each BS may be limited to 1, and the UE may assume that the number of codewords is 1 when calculating the CSI 2.

Method 3) SB CSI reporting assuming that both the first BS (e.g., TP 1) and the second BS (e.g., TP 2) transmit data through the same time resource and frequency resource For convenience of description, the CSI report corresponding to method 3) may be referred to as "CSI 3" for convenience of description below.

Table 12 shows an example of SB CSI reporting for a case where there are a total of three SB s.

TABLE 12

| SB | BS | CW | PDSCH | PMI FB | RI FB | SINR | CMR | IMR | CQI FB |
|----|----|----|-------|--------|-------|------|-----|-----|--------|
| 1 | 1 | 1 | 1 | SB PMI 1 | RI 1 | SINR 1 | CSI-RS 1 | IMR | SB |
|   |   |   |   |          | RI 2 |        |          | CSI-RS 2 | CQI 1 |
|   | 2 | 2 |   | SB PMI 2 |      | SINR 2 | CSI-RS 2 | IMR | SB |
|   |   |   |   |          |      |        |          | CSI-RS 1 | CQI 2 |
| 2 | 1 | 1 |   | SB PMI 1 |      | SINR 1 | CSI-RS 1 | IMR | SB |
|   |   |   |   |          |      |        |          | CSI-RS 2 | CQI 1 |
|   | 2 | 2 |   | SB PMI 2 |      | SINR 2 | CSI-RS 2 | IMR | SB |
|   |   |   |   |          |      |        |          | CSI-RS 1 | CQI 2 |
| 3 | 1 | 1 |   | SB PMI 1 |      | SINR 1 | CSI-RS 1 | IMR | SB |
|   |   |   |   |          |      |        |          | CSI-RS 2 | CQI 1 |
|   | 2 | 2 |   | SB PMI 2 |      | SINR 2 | CSI-RS 2 | IMR | SB |
|   |   |   |   |          |      |        |          | CSI-RS 1 | CQI 2 |

Referring to Table 12, the UE may report the PMI and CQI for each SB. Each row in Table 12 may indicate CSI corresponding to each SB.

For example, SB PMI 1, SB PMI 2, SB CQI 1, and SB CQI 2 in a first column (i.e., SB 1) may refer to report on the first SB among three SBs, and in the case of RI, the UE may report a common WB RI (i.e., RI 1, RI 2) without SB classification.

Since it is assumed that the BS participating in data transmission in each SB is the first BS and the second BS, when calculating CSI, the UE may calculate RI1, SB PMI 1, and/or SB CQI 1 through channel measurement using CMR (e.g., CSI-RS 1) transmitted by the first BS and through interference measurement using CSI-RS 2 transmitted by the second BS. Similarly, the UE may calculate RI 2, SB PMI 2, and/or SB CQI 2 through channel measurement using CMR (e.g., CSI-RS 2) transmitted by the second BS and interference measurement using IMR and CSI-RS 1 transmitted by the first BS. 2.

In addition, in the case of NCJT, the number of transmission codewords of each BS may be limited to 1, and each BS may transmit a different codeword. Therefore, when calculating CSI, the UE may assume that the number of codewords of each SB is 2, and an i-th RI (RI i), an i-th PMI (PMI i), and/or the i-th CQI (CQI i) may refer to a transmission rank, a transmission PMI, and/or a transmission CQI of the i-th codeword, respectively.

After the BS receives the CSI (i.e., CSI 1, CSI 2, and CSI 3) of the three methods described above from the UE, the BS (e.g., the representative BS) may set MCS, rank and precoder using the CSI 1 for a frequency resource (e.g., RB) in which only the first BS transmits data and may be configured to transmit data to the UE based thereon. Also, for a frequency resource (e.g., RB) in which only the second BS (e.g., TP 2) transmits data, the BS (e.g., the representative BS) may set MCS, rank, and precoder using the CSI 2 and may be configured to transmit data to the UE based thereon. Also, for a frequency resource (e.g., RB) n which both the first BS (e.g., TP 1) and the second BS (e.g., TP 2) transmit data, the BS (e.g., the representative BS) may set MCS, rank, and precoder using the CSI 3 and may be configured to transmit data to the UE based thereon.

For example, it is assumed that TP 1 performs data transmission on SB 1, TP 2 performs data transmission on SB 2, and both TP 1 and TP 2 perform data transmission on SB 3. In this case, the BS sets MCS, rank, precoder, etc. using CSI 1 in SB 1, sets MCS, rank, precoder, etc. using CSI 2 in SB 2, and sets MCS, rank, precoder, etc. using CSI 3 in SB 3.

Here, since the first BS (e.g., TP 1) transmits the first codeword (e.g., CW 1) in SB 1 and SB 3, one MCS may be set using the CQI of CSI 1 and the CQI of CSI 3. Similarly, in SB 1 and SB 3, the rank transmitted by the first BS (e.g., TP 1) needs to be equally set. When RI 1 of SB 1 and RI 1 of SB 3 reported through CSI 1 and CSI 3 are different, the BS should determine one rank. In this process, changing the remaining CSI, i.e., PMI and/or CQI, to match the changed rank may have high complexity, and accuracy of the changed value may be low. Therefore, the UE should report the rank values of the CSI 1 and the CSI 3 (i.e., RI 1) as the same value. Restricting the rank value between CSI 1 and CSI 3 equally is supported in an existing system (e.g., CoMP in an LTE system) and may be similarly applied to an NR system.

However, since two RI values (i.e., RI 1 and RI 2) are reported in CSI 3, RI 1 of CSI 3 is limited to the same value as RI 1 of CSI 1, and of RI 2 of CSI 3 should be limited to the same value as RI 2 of CSI 2. That is, an RI value may be calculated for each of the two CMRs (i.e., CSI-RS 1 and CSI-RS 2) constituting the CSI 3, and each RI value needs to be limited to the same value as the RI of the third CSI (i.e., another CSI) using the same CMR.

As described above, in the aforementioned methods 1), 2) and 3), RI 1 of CSI 1 and RI 1 of CSI 3 are limited to the same RI value, and RI 2 of CSI 2 and RI 2 of CSI 3 are limited to the same RI value. In this case, the UE may additionally transmit "CSI 4" and "CSI 5" to the BS.

The CSI 4 is the same as the CSI 1, but may refer to CSI reporting in a manner of independently setting the RI based on only the CMR and IMR connected to CSI 4 without limitation of the same RI value. In addition, although CSI 5 is the same as CSI 2, it may refer to CSI reporting in a method of independently setting RI based on only CMR and IMR connected to CSI 5 without limitation of the same RI value. When the BS (e.g., a representative BS) transmits data in a non-joint transmission method (i.e., a non-CoMP method), it may perform scheduling on the UE using the CSI 4 and/or the CSI 5. For example, when only the first BS (e.g., TP 1) transmits data, the scheduling is performed using CSI 4, and when only the second BS (e.g., TP 2) transmits data, the scheduling may be performed using CSI 5.

In addition, the BS may perform scheduling for data transmission by dynamically switching joint transmission (e.g., CoMP) and non-joint transmission (e.g., non-CoMP) using the aforementioned CSI 1, CSI 2, CSI 3, CSI 4 and/or CSI 5. Also, both partially overlapped NCJT and full overlapped NCJT may be supported using the aforementioned CSI 1, CSI 2, and CSI 3. For example, in the case of full overlapped NCJT, scheduling may be performed using only CSI 3.

When the UE calculates the aforementioned CSI 1, CSI 2, CSI 3, CSI 4, and/or CSI 5, the number of BSs (e.g., TPs) transmitting data for each CSI is assumed to be a specific value.

In contrast, in this embodiment of the present disclosure, a method in which the BS informs the UE in advance about a BS transmitting data for each frequency resource unit (e.g., RB, SB, etc.) and/or whether to perform joint transmission (e.g., CoMP) is proposed. In this case, the UE may calculate CSI for each SB based on the information and may report the calculated CSI. Table 13 shows an example of the CSI calculation method and data scheduling results proposed in the present disclosure.

and the second BS (e.g., TP 2) may transmit the second codeword CW 2 in SB 2 and SB 3. In this case, the UE may report the PMI and CQI for each SB, and the corresponding UE may report the RI in the form of WB information without reporting the RI for each SB.

For example, in SB 1, only the first BS (e.g., TP 1) participates in data transmission (i.e., because it is set to perform data transmission), the UE may calculate signal-to-interference-plus-noise ratio (SINR) 1 based on channel measurement using CSI-RS 1 received from the first BS and interference measurement using IMR of the first BS. The corresponding UE may determine (or generate) PMI and/or CQI in SB 1 based on the calculated SINR 1.

In SB 2, both the first BS (e.g., TP 1) and the second BS (e.g., TP 2) participate in data transmission, and thus, the UE calculates the PMI and/or CQI for each BS and report (or transmit) the calculated PMI and/or CQI. The UE may calculate SINR 1-1 based on channel measurement using CSI-RS 1 received from the first BS and interference measurement using IMR of the first BS and CSI-RS 2 received from the second BS. The corresponding UE may determine (or generate) the PMI and/or CQI for the first BS in SB 2 based on the calculated SINR 1-1. In addition, the UE may calculate SINR 2-1 based on channel measurement using CSI-RS 2 received from the second BS and interference measurement using IMR of the second BS and CSI-RS 1 received from the first BS. The corresponding UE may determine (or generate) the PMI and/or CQI for the second BS in SB 2 based on the calculated SINR 2-1.

In SB 3, only the second BS (e.g., TP 2) participates in data transmission, and thus, the UE may calculate SINR 2 based on channel measurement using CSI-RS 2 received from the second BS and interference measurement using the IMR of the second BS. The corresponding UE may determine (or generate) PMI and/or CQI in SB 3 based on the calculated SINR 2.

In addition, the BS may perform scheduling of data transmission based on the CSI received (i.e., reported) from the UE through the aforementioned proposed method.

TABLE 13

| SB | BS | CW | PDSCH | PMI/RI FB | SINR | CMR | IMR | CQI | DCI 1 | DCI 2 | DMRS |
|---|---|---|---|---|---|---|---|---|---|---|---|
| 1 | 1 | 1 | 1 | PMI 1, RI 1 | SINR 1 | CSI-RS 1 | IMR | CQI 1 | RA, MCS DMRS | RA, MCS DMRS | 0, 1 |
| 2 | 1 | 1 | 1 | PMI 1, PMI | SINR 1-1 | CSI-RS 1 | IMR, CSI-RS 2 | CQI 1 | {0, 1}, ... | {2, 3}, ... | 0, 1, 2, 3 |
|   | 2 | 2 | 2 | 2, RI 1, RI 2 | SINR 2-1 | CSI-RS 2 | IMR, CSI-RS 1 | CQI 2 |   |   |   |
| 3 | 2 | 2 | 2 | PMI 2, RI 2 | SINR 2 | CSI-RS 2 | IMR | CQI 2 |   |   | 2, 3 |

Referring to Table 13, an example of SB CSI reporting for a case where there are a total of three SBs is shown. In Table 13, DCI 1 indicates DCI by a first BS (e.g., TP 1), DCI 2 indicates DCI by a second BS (e.g., TP 2), and DMRS may refer to DMRS reception in the UE.

The first BS (e.g., TP 1) transmits data in SB 1, and the first BS (e.g., TP 1) and the second BS (e.g., TP 2) transmit data in SB 2, and the second BS (e.g., TP 2) may transmit data in SB 3. Also, it is assumed that each BS (e.g., TP) transmits one different codeword. That is, the first BS (e.g., TP 1) transmits the first codeword CW 1 in SB 1 and SB 2, For example, the first BS may schedule first data (e.g., a first codeword) in SB 1 and SB 2, and the first DMRS group (e.g., port {0, 1}) may be used. In this case, the BS (e.g., the first BS) may set a single MCS using the CQI in SB 1 and the CQI in SB 2. Also, the corresponding BS may set the precoder to be applied in SB 1 and the precoder to be applied in SB 2 by using the PMI in SB 1 and CQI in SB 2, respectively.

In addition, the second BS may schedule second data (e.g., a second codeword) in SB 2 and SB 3, and a second DMRS group (e.g., port {2, 3}) may be used as in the first embodiment described above. In this case, the BS (e.g., the second BS) may set a single MCS using the CQI in SB 2 and the CQI in SB 3. Also, the corresponding BS may set a precoder to be applied in SB 2 and a precoder to be applied to SB 3 by using the PMI in SB 2 and CQI in SB 3, respectively.

FIG. 13 shows a signaling example of a method of transmitting and receiving CSI between a BS and a UE in a wireless communication system to which the method proposed in the present disclosure may be applied. FIG. 13 is only for convenience of description and does not limit the scope of the present disclosure.

Referring to FIG. 13, joint transmission (e.g., NCJT) is performed between a UE and a BS, and the BS described in FIG. 13 represents one of a plurality of BSs participating in the joint transmission. Also, some of the operations and/or steps shown in FIG. 13 may be omitted.

The UE (e.g., 100/200 in FIGS. 17 to 21) may receive configuration information related to joint transmission from the BS (e.g., 100/200 in FIGS. 17 to 21) (S1305). The configuration information may include information on a BS related to joint transmission, information on whether joint transmission is performed, information on a resource region related to joint transmission, and the like. For example, as described above, the BS may transmit information on the configuration of the BS participating in data transmission for each specific resource unit (e.g., RB, SB, etc.) and information on whether joint transmission is performed to the UE.

For example, an operation in which the UE (e.g., 100/200 of FIGS. 17 to 21) of step S1305 described above receives the configuration information from the BS (e.g., 100/200 of FIGS. 17 to 21) may be implemented by the apparatus of FIGS. 17 to 21 which will be described below. For example, referring to FIG. 18, one or more processors 102 may control one or more transceivers 106 and/or one or more memories 104 to receive the configuration information, and the one or more transceivers 106 may receive the configuration information. Similarly, the operation in which the BS (e.g., 100/200 in FIGS. 17 to 21) of the aforementioned step S1305 transmits the configuration information to the UE (e.g., 100/200 in FIGS. 17 to 21) may be implemented by the apparatus of FIGS. 17 to 21 which will be described hereinafter. For example, referring to FIG. 18, one or more processors 102 may control one or more transceivers 106 and/or one or more memories 104 to transmit the configuration information, and the one or more transceivers 106 may transmit the configuration information.

The UE (e.g., 100/200 in FIGS. 17 to 21) may receive a measurement resource from the BS (e.g., 100/200 in FIGS. 17 to 21) (S1310). Here, the measurement resource may include a channel measurement resource (CMR) and/or an interference measurement resource (IMR). For example, the UE may receive a first CSI-RS, which is a channel measurement resource, and CSI-IM, which is an interference measurement resource, from a first BS. In addition, the UE may receive a second CSI-RS, which is a channel measurement resource, and CSI-IM, which is an interference measurement resource, from a second BS.

For example, an operation in which the UE (e.g., 100/200 of FIGS. 17 to 21) of step S1310 described above receives the measurement resource from the BS (e.g., 100/200 of FIGS. 17 to 21) may be implemented by the apparatus of FIGS. 17 to 21 which will be described below. For example, referring to FIG. 18, one or more processors 102 may control one or more transceivers 106 and/or one or more memories 104 to receive the measurement resource, and the one or more transceivers 106 may receive the measurement resource. Similarly, the operation in which the BS (e.g., 100/200 in FIGS. 17 to 21) of the aforementioned step S1310 transmits the measurement resource to the UE (e.g., 100/200 in FIGS. 17 to 21) may be implemented by the apparatus of FIGS. 17 to 21 which will be described hereinafter. For example, referring to FIG. 18, one or more processors 102 may control one or more transceivers 106 and/or one or more memories 104 to transmit the measurement resource, and the one or more transceivers 106 may transmit the measurement resource.

The UE (e.g., 100/200 of FIGS. 17 to 21) may calculate CSI for the BS based on the configuration information (S1315). In this case, the CSI may be calculated based on channel measurement and/or interference measurement by the received measurement resource. For example, when a plurality of BSs are configured in a specific frequency resource unit as in the aforementioned proposed method, the CSI may be calculated based on channel measurement and interference measurement using the measurement resources of the plurality of BSs.

For example, the operation in which the UE (e.g., 100/200 in FIGS. 17 to 21) of the aforementioned step S1315 calculates the CSI may be implemented by the apparatus of FIGS. 17 to 21 to be described below. For example, referring to FIG. 18, one or more processors 102 may control one or more transceivers 106 and/or one or more memories 104 to calculate the CSI.

The UE (e.g., 100/200 in FIGS. 17 to 21) may transmit (or report) the calculated CSI to the BS (e.g., 100/200 in FIGS. 17 to 21) (S1320). Similarly, the BS (e.g., 100/200 in FIGS. 17 to 21) may receive the CSI from the UE (e.g., 100/200 in FIGS. 17 to 21). For example, the CSI may be the same as CSI 1, CSI 2, CSI 3, CSI 4, CSI 5 and/or CSI shown in Table 13 in the aforementioned proposed method.

For example, the operation in which the UE of the aforementioned step S1320 transmits CSI to the BS (e.g., 100/200 in FIGS. 17 to 21) may be implemented by the apparatus of FIGS. 17 to 21 to be described. For example, referring to FIG. 18, one or more processors 102 may control one or more transceivers 106 and/or one or more memories 104 to transmit the CSI, and the one or more transceivers 106 may transmit the CSI. Similarly, the operation in which the BS (e.g., 100/200 in FIGS. 17 to 21) of the aforementioned step S1320 receives the CSI from the UE (e.g., 100/200 in FIGS. 17 to 21) may be implemented by the apparatus of FIGS. 17 to 21 which will be described below. For example, referring to FIG. 18, one or more processors 102 may control one or more transceivers 106 and/or one or more memories 104, etc. to receive the CSI, and one or more transceivers 106 may receive the CSI.

Thereafter, the UE (e.g., 100/200 in FIGS. 17 to 21) may receive DCI configured based on the CSI from the BS (e.g., 100/200 in FIGS. 17 to 21) (S1325). Similarly, the BS (e.g., 100/200 in FIGS. 17 to 21) may transmit the DCI configured based on the CSI to the UE (e.g., 100/200 in FIGS. 17 to 21). For example, as in the aforementioned proposed method, the DCI may include information on MCS configured based on the CSI reported by the UE, resource allocation information, DMRS port-related information, a rank value, a precoder, rate matching information of a resource related to a DMRS, etc. For example, the MCS may be configured differently for each codeword. Using the DCI, the BS may perform scheduling of data to be transmitted to the UE, and the corresponding UE may perform reception and decoding of data transmitted from the BS(s) using the DCI.

For example, the operation in which the UE (e.g., 100/200 of FIGS. 17 to 21) of step S1325 described above receives the DCI from the BS (e.g., 100/200 of FIGS. 17 to 21) be implemented by the apparatus of FIGS. 17 to 21 to be described. For example, referring to FIG. 18, one or more processors 102 may control one or more transceivers 106 and/or one or more memories 104 to receive the DCI, and the one or more transceivers 106 may receive the DCI. Similarly, the operation in which the BS (e.g., 100/200 in FIGS. 17 to 21) of the aforementioned step S1325 transmits the DCI to the UE (e.g., 100/200 in FIGS. 17 to 21) may be implemented by the apparatus of FIGS. 17 to 21 which will be described below. For example, referring to FIG. 18, one or more processors 102 may control one or more transceivers 106 and/or one or more memories 104 to transmit the DCI, and the one or more transceivers 106 may transmit the DCI.

FIG. 14 shows an example of an operation flowchart of a UE transmitting CSI in a wireless communication system to which the method proposed in this disclosure may be applied. FIG. 14 is only for convenience of description and does not limit the scope of the present disclosure.

Referring to FIG. 14, it is assumed that FIG. 14 is an example of an operation flowchart according to the operation of the UE in FIG. 13 described above. Accordingly, in the detailed description of each operation, the content overlapping with the content described in FIG. 13 will be omitted from the description of FIG. 14.

The UE may receive configuration information related to joint transmission from the BS (S1405). The configuration information may include information on a BS related to joint transmission, information on whether joint transmission is performed, information on a resource region related to joint transmission, and the like.

The UE may calculate CSI based on the configuration information and/or measurement resources (e.g., channel measurement resources, interference measurement resources, etc.) received from the BS (S1410). The corresponding UE may calculate the CSI by considering (or assuming) the number of BSs, the number of codewords, and/or an index of the codewords. For example, as in the aforementioned proposed method, when a plurality of BSs are configured in a specific frequency resource unit, the CSI may be calculated based on channel measurement and interference measurement using the measurement resources of the plurality of BSs. Here, the plurality of BSs may include a first BS and a second BS, and the CSI may include a first CSI for the first BS and a second CSI for the second BS.

In addition, as in the aforementioned proposed method, the first CSI may be calculated based on i) a first channel measurement by the channel measurement resource of the first BS and ii) a first interference measurement resource based on the first BS and channel measurement resource of the second BS, or the second CSI may be calculated based on i) a second channel measurement by the channel measurement resource of the second BS and ii) a second interference measurement by the interference measurement resource of the second BS and the channel measurement resource of the first BS.

Also, as in the aforementioned proposed method, the first CSI may include a first precoding matrix indicator (PMI) and a first channel quality indicator (CQI), and the second CSI may include a second PMI and a second CQI. In this case, the first PMI and the first CQI may be determined based on an SINR value calculated by the first channel measurement and the first interference measurement, and the second PMI and the second CQI may be determined based on an SINR value calculated by the second channel measurement and the second interference measurement. In addition, the first CSI may further include a first rank indicator (RI) for the first BS, and the second CSI may further include a second RI for the second BS. In this case, the first PMI, the first CQI, the second PMI, and the second CQI may be reported for each subband, and the first RI and the second RI are set to be reported in a wideband format.

Thereafter, the UE may transmit (or report) CSI to the BS (S1415).

Also, as in the aforementioned proposed method, the first BS and the second BS may be configured to transmit different codewords.

Using the method proposed in this embodiment of the present disclosure, when the BS performs joint transmission (e.g., CoMP transmission) through partially overlapped resource allocation, there is an effect that more accurate scheduling may be performed by receiving the proposed CSI. That is, a transmission rate of CoMP transmission may be improved through accurate MCS configuration and resource allocation based on the aforementioned proposed method.

Fourth Embodiment

Next, a method of calculating and/or reporting CSI considering codewords classified according to overlapping of time resources and/or frequency resources when considering the aforementioned joint transmission (e.g., NCJT) between a plurality of BSs (e.g., multiple TPs, multiple TRPs, etc.) and a UE in a wireless communication system will be described.

In this embodiment of the present disclosure, the description is based on a case where frequency resources are overlapped, but the methods described below may also be extended and applied to a case where time resources are overlapped and a case where time resources and frequency resources are overlapped. In addition, in this embodiment, IMR refers to an interference measurement resource, CMR refers to a channel measurement resource, FB refers to feedback, SB refers to a subband, WB refers to a wideband, and CW refers to a codeword.

In the case of the CSI calculation and/or reporting method of Table 13 described above, the UE calculates CSI assuming that one codeword is transmitted per BS, and the actual scheduling may also be set to transmit one codeword per BS. In this case, in SB 1, data transmitted by the first BS may be transmitted without inter-layer interference by the second BS, but in SB 1, there may be an influence of the inter-layer interference. As described above, even though the channel environment is different, the BS transmits one codeword based on one MCS, and thus, it may be difficult to perform optimized transmission for each channel environment.

In consideration of this, in this embodiment of the present disclosure, each BS proposes a method of transmitting different codewords for an RB that is joint transmission and an RB that is non-joint transmission (i.e., single BS transmission).

Table 14 shows an example of CSI calculation and data scheduling in a case where the BS transmits codewords differently depending on whether joint transmission is performed

TABLE 14

| SB | BS | CW | PDSCH | PMI/RI FB | SINR | CMR | IMR | CQI | DCI 1 | DCI 2 | DMRS |
|---|---|---|---|---|---|---|---|---|---|---|---|
| 1 | 1 | 1-1 | 1 | PMI 1, RI 1 | SINR 1 | CSI-RS 1 | IMR | CQI 1-1 | RA, MCS 1, | RA, MCS 1, | 0, 1 |
| 2 | 1-2 | 1 | 1 | PMI 1, PMI 2, RI 1, RS 2 | SINR 1-2 | CSI-RS 1 | IMR, CSI-RS 2 | CQI 1-2 | MCS 2, DMRS | MCS 2, DMRS | 0, 1, 2, 3 |
|  | 2 | 2-1 | 2 | SINR 2-2 | CSI-RS 2 | IMR, CSI-RS 1 | CQI 2-1 | {0, 1}, ... | {2, 3}, ... |  |  |
| 3 | 2 | 2-2 | 2 | PMI 2, RI 2 | SINR 2 | CSI-RS 2 | IMR | CQI 2-2 |  |  | 2, 3 |

Referring to Table 14, an example of SB CSI reporting for a case where there are a total of three SBs is shown. In Table 14, DCI 1 indicates DCI by a first BS (e.g., TP 1), DCI 2 indicates DCI by a second BS (e.g., TP 2), and DMRS may refer to DMRS reception in the UE.

Table 14 shows that, unlike Table 13, codewords of each BS (e.g., TP 1 and TP 2) are separated for the SB (i.e., SB 2) on which joint transmission is performed and the SBs (i.e., SB 1, SB 3) on which non-joint transmission is performed. The corresponding UE may calculate the CSI by assuming the separation of the codeword.

In the case of SB CSI feedback, since the UE calculates CSI for each SB, there may be no difference between the operation described in Table 13 and the operation described in Table 14 in terms of CSI transmission (or reporting). However, in the case of WB CSI feedback, a difference may occur. For example, in Table 13, the UE reports RI i, PMI and/or CQI i for each i-th BS, but in Table 14, the UE reports WB RI i, PMI i, CQI i-1, and/or CQI i-2 for each BS, the CQI for the SB of the joint transmission and the CQI for the SB of the non-joint transmission may be reported separately.

In Table 14, each BS (e.g., TP 1, TP 2) transmits the codeword for the RB of joint transmission and the codeword for the RB of non-joint transmission separately, and since MCS is set for each codeword, MCS for the RB of joint transmission and MCS for the RB of non-joint transmission may be scheduled separately.

After receiving the DCI from the BS (e.g., representative BS), the UE may identify joint transmission or non-joint transmission through resource allocation of a first BS (e.g., TP 1) and resource allocation of a second BS. The corresponding UE may receive first codeword CW 1-1 and the second codeword CW 1-2 of the first BS in the RB of joint transmission and RB of the non-joint transmission (among the RBs indicated by the resource allocation of the first BS), respectively, and in this case, MCS 1 and MCS 2 of the first BS may be applied, respectively. In addition, the corresponding UE may receive a first codeword CW 2-1 and a second codeword CW 2-2 of the second BS in the RB of joint transmission and the RB of non-joint transmission (among the RBs indicated by the resource allocation of the second BS), respectively, and in this case, MCS 1 and MCS 2 of the second BS may be applied, respectively.

In addition, in the proposed method based on Table 14, as the UE receives two codewords for each BS (e.g., TP), in case of joint transmission by two BSs, a total of four codewords are received. Considering the implementation complexity of such a UE, a method in which, in the RB of non-joint transmission, the first BS (e.g., TP 1) and the second BS (e.g., TP 2) transmit codewords one by one, and in the RB of joint transmission, the first BS and the second BS transmit the same one codeword, thereby transmitting a total of three codewords, may be considered.

Accordingly, the UE may receive three MCSs corresponding to three codewords through DCI and receive the three codewords (CW 1, CW 2, and CW 3), respectively, by applying the received three MCSs to an RB in which only the first BS transmits data, an RB in which only the second BS transmits data, and an RB in which both the first BS and the second BS transmit data. Similarly, even when the UE calculates and reports CSI, the UE may calculate and report different RIs, PMIs, and/or CQIs for each of the SB in which only the first BS transmits data, the SB in which only the second BS transmits data, and the SB in which the first BS and the second BS transmit data (assuming transmission of data corresponding to each SB).

And/or, a method in which the first BS and the second BS transmit the same one codeword in the RB of the non-joint transmission and the first BS and the second BS transmit the same one codeword in the RB of the joint transmission, thereby transmitting a total of two codewords, may also be considered. Accordingly, the UE may receive two MCSs corresponding to the two codewords through DCI and receive two codewords CW1 and CW2 by applying the received two MCS to the RB of joint transmission and the RB of non-joint transmission, respectively. Similarly, even when the UE calculates and reports CSI, the UE may calculate and report different RI, PMI, and/or CQI for each SB of joint transmission and SB of non-joint transmission (assuming transmission of data corresponding to each SB).

FIG. 15 shows a signaling example of a method of transmitting and receiving CSI between a BS and a UE in a wireless communication system to which the method proposed in this disclosure may be applied. FIG. 15 is only for convenience of description and does not limit the scope of the present disclosure.

Referring to FIG. 15, joint transmission (e.g., NCJT) is performed between a UE and a BS, and the BS described in FIG. 15 represents one of a plurality of BSs participating in the joint transmission. Also, some of the operations and/or steps shown in FIG. 15 may be omitted.

The UE (e.g., 100/200 in FIGS. 17 to 21) may receive configuration information related to joint transmission from the BS (e.g., 100/200 in FIGS. 17 to 21) (S1505). The configuration information may include information on a BS related to joint transmission, information on whether joint transmission is performed, information on a resource region related to joint transmission, and the like. For example, as described above, the BS may transmit information on the configuration of the BS participating in data transmission for each specific resource unit (e.g., RB, SB, etc.) and information on whether joint transmission is performed to the UE.

For example, an operation in which the UE (e.g., 100/200 of FIGS. 17 to 21) of step S1505 described above receives the configuration information from the BS (e.g., 100/200 of FIGS. 17 to 21) may be implemented by the apparatus of FIGS. 17 to 21 which will be described below. For example, referring to FIG. 18, one or more processors 102 may control one or more transceivers 106 and/or one or more memories 104 to receive the configuration information, and the one or more transceivers 106 may receive the configuration information. Similarly, the operation in which the BS (e.g., 100/200 in FIGS. 17 to 21) of the aforementioned step S1505 transmits the configuration information to the UE (e.g., 100/200 in FIGS. 17 to 21) may be implemented by the apparatus of FIGS. 17 to 21 which will be described hereinafter. For example, referring to FIG. 18, one or more processors 102 may control one or more transceivers 106 and/or one or more memories 104 to transmit the configuration information, and the one or more transceivers 106 may transmit the configuration information.

The UE (e.g., 100/200 in FIGS. 17 to 21) may receive a measurement resource from the BS (e.g., 100/200 in FIGS. 17 to 21) (S1510). Here, the measurement resource may include a channel measurement resource (CMR) and/or an interference measurement resource (IMR). For example, the UE may receive a first CSI-RS, which is a channel measurement resource, and CSI-IM, which is an interference measurement resource, from a first BS. In addition, the UE may receive a second CSI-RS, which is a channel measurement resource, and CSI-IM, which is an interference measurement resource, from a second BS.

For example, an operation in which the UE (e.g., 100/200 of FIGS. 17 to 21) of step S1510 described above receives the measurement resource from the BS (e.g., 100/200 of FIGS. 17 to 21) may be implemented by the apparatus of FIGS. 17 to 21 which will be described below. For example, referring to FIG. 18, one or more processors 102 may control one or more transceivers 106 and/or one or more memories 104 to receive the measurement resource, and the one or more transceivers 106 may receive the measurement resource. Similarly, the operation in which the BS (e.g., 100/200 in FIGS. 17 to 21) of the aforementioned step S1510 transmits the measurement resource to the UE (e.g., 100/200 in FIGS. 17 to 21) may be implemented by the apparatus of FIGS. 17 to 21 which will be described hereinafter. For example, referring to FIG. 18, one or more processors 102 may control one or more transceivers 106 and/or one or more memories 104 to transmit the measurement resource, and the one or more transceivers 106 may transmit the measurement resource.

The UE (e.g., 100/200 of FIGS. 17 to 21) may calculate CSI for the BS based on the configuration information (S1515). In this case, the CSI may be calculated based on channel measurement and/or interference measurement by the received measurement resource. For example, as in the aforementioned proposed method, the CSI may include a first CSI for a first codeword of the BS and a second CSI for a second codeword of the BS. Here, the first CSI and the second CSI may be separately calculated according to whether a plurality of BSs are configured in a specific frequency resource unit. That is, as in the aforementioned proposed method, the CSI calculation may be performed in consideration of the classification of the BS (e.g., TP) as well as the classification of codewords of the same BS.

For example, the operation in which the UE (e.g., 100/200 in FIGS. 17 to 21) of the aforementioned step S1515 calculates the CSI may be implemented by the apparatus of FIGS. 17 to 21 to be described below. For example, referring to FIG. 18, one or more processors 102 may control one or more transceivers 106 and/or one or more memories 104 to calculate the CSI.

The UE (e.g., 100/200 in FIGS. 17 to 21) may transmit (or report) the calculated CSI to the BS (e.g., 100/200 in FIGS. 17 to 21) (S1520). Similarly, the BS (e.g., 100/200 in FIGS. 17 to 21) may receive the CSI from the UE (e.g., 100/200 in FIGS. 17 to 21). For example, the CSI may be the same as CSI 1, CSI 2, CSI 3, CSI 4, CSI 5 and/or CSI shown in Table 13 in the aforementioned proposed method.

For example, the operation in which the UE of the aforementioned step S1520 transmits CSI to the BS (e.g., 100/200 in FIGS. 17 to 21) may be implemented by the apparatus of FIGS. 17 to 21 to be described. For example, referring to FIG. 18, one or more processors 102 may control one or more transceivers 106 and/or one or more memories 104 to transmit the CSI, and the one or more transceivers 106 may transmit the CSI. Similarly, the operation in which the BS (e.g., 100/200 in FIGS. 17 to 21) of the aforementioned step S1520 receives the CSI from the UE (e.g., 100/200 in FIGS. 17 to 21) may be implemented by the apparatus of FIGS. 17 to 21 which will be described below. For example, referring to FIG. 18, one or more processors 102 may control one or more transceivers 106 and/or one or more memories 104, etc. to receive the CSI, and one or more transceivers 106 may receive the CSI.

Thereafter, the UE (e.g., 100/200 in FIGS. 17 to 21) may receive DCI configured based on the CSI from the BS (e.g., 100/200 in FIGS. 17 to 21) (S1525). Similarly, the BS (e.g., 100/200 in FIGS. 17 to 21) may transmit the DCI configured based on the CSI to the UE (e.g., 100/200 in FIGS. 17 to 21). For example, as in the aforementioned proposed method, the DCI may include information on MCS configured based on the CSI reported by the UE, resource allocation information, DMRS port-related information, a rank value, a precoder, and the like. For example, the MCS may be configured differently for each codeword. Using the DCI, the BS may perform scheduling of data to be transmitted to the UE, and the corresponding UE may perform reception and decoding of data transmitted from the BS(s) using the DCI.

For example, the operation in which the UE (e.g., 100/200 of FIGS. 17 to 21) of step S1525 described above receives the DCI from the BS (e.g., 100/200 of FIGS. 17 to 21) be implemented by the apparatus of FIGS. 17 to 21 to be described. For example, referring to FIG. 18, one or more processors 102 may control one or more transceivers 106 and/or one or more memories 104 to receive the DCI, and the one or more transceivers 106 may receive the DCI. Similarly, the operation in which the BS (e.g., 100/200 in FIGS. 17 to 21) of the aforementioned step S1525 transmits the DCI to the UE (e.g., 100/200 in FIGS. 17 to 21) may be implemented by the apparatus of FIGS. 17 to 21 which will be described below. For example, referring to FIG. 18, one or more processors 102 may control one or more transceivers 106 and/or one or more memories 104 to transmit the DCI, and the one or more transceivers 106 may transmit the DCI.

FIG. 16 shows an example of an operation flowchart of a UE transmitting CSI in a wireless communication system to which the method proposed in this disclosure may be applied. FIG. 16 is only for convenience of description and does not limit the scope of the present disclosure.

Referring to FIG. 16, it is assumed that FIG. 16 is an example of an operation flowchart according to the operation of the UE in FIG. 15 described above. Accordingly, in the detailed description of each operation, the content overlapping with the content described in FIG. 15 will be omitted from the description of FIG. 16.

The UE may receive configuration information related to joint transmission from the BS (S1605). The configuration information may include information on a BS related to joint transmission, information on whether joint transmission is performed, information on a resource region related to joint transmission, and the like.

The UE may calculate CSI based on the configuration information and/or measurement resources (e.g., channel measurement resources, interference measurement resources, etc.) received from the BS (S1610). The corresponding UE may calculate the CSI by considering (or assuming) the number of BSs, the number of codewords, and/or an index of the codewords. For example, as in the aforementioned proposed method, the CSI may include a first CSI for a first codeword of the BS and a second CSI for a second codeword of the BS. Here, the first CSI and the second CSI may be separately calculated according to whether a plurality of BSs are configured in a specific frequency resource unit.

For example, the first CSI may be calculated when the plurality of BSs are configured in the specific frequency resource unit, and the second CSI may be calculated when a single BS is configured in the specific frequency resource unit. In this case, a first channel quality indicator (CQI) included in the first CSI and a second CQI included in the second CSI may be reported separately by the UE.

In addition, the UE may receive, from the BS, a DCI including scheduling information based on the first CSI and the second CSI, and receive data from the BS based on the DCI. Here, the scheduling information may include first modulation and coding scheme (MCS) information for the first codeword and second MCS information for the second codeword. Also, the data may be received based on the first MCS information and the second MCS information. In addition, the scheduling information may further include information on a DMRS port group (e.g., ports {0, 1}, ports {2, 3}, etc.) for the BS.

Thereafter, the UE may transmit (or report) the CSI to the BS (S1615).

Using the method proposed in this embodiment of the present disclosure, the BS may perform accurate scheduling by receiving the proposed CSI when performing joint transmission (e.g., CoMP transmission) through partially overlapped resource allocation. That is, the transmission rate of CoMP transmission may be improved through accurate MCS configuration and resource allocation based on the aforementioned proposed method.

As mentioned above, the aforementioned signaling and operation between the BS and/or the UE (e.g., the first to fourth embodiments and/or FIGS. 8 to 16, etc.) may be implemented by the apparatus to be described below (e.g., FIGS. 17 to 21). For example, the BS may correspond to a first wireless device, the UE may correspond to a second wireless device, and vice versa may be considered in some cases.

For example, signaling and operations between the aforementioned BS and/or UE (e.g., the first to fourth embodiments and/or FIGS. 8 to 16, etc.) may be performed by one or more processors of FIGS. 17 to 21. (e.g., 102 and 202), and signaling and operations between the aforementioned BS and/or UE (e.g., the first to fourth embodiments and/or FIGS. 8 to 16, etc.) may be stored in the memory (e.g., one or more memories 104 and 204 of FIG. 18) in the form of a command/program (e.g., instruction, executable code) for driving at least one processor (e.g., 102, 202) of FIGS. 17 to 21.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system applied to the disclosure.

Referring to FIG. 17, a communication system (1) applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 18 illustrates wireless devices applicable to the disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 19 illustrates a signal processing circuit for a transmit signal.

Referring to FIG. 19, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 19 may be performed by the processors 102 and 202 and/or the transceivers 106 and 206 of FIG. 18. Hardware elements of FIG. 19 may be implemented in the processors 102 and 202 and/or the transceivers 106 and 206 of FIG. 18. For example, blocks 1010 to 1060 may be implemented in the processors 102 and 202 of FIG. 18. Further, blocks 1010 to 1050 may be implemented in the processors 102 and 202 of FIG. 18 and the block 1060 of FIG. 18 and the block 1060 may be implemented in the transceivers 106 and 206 of FIG. 18.

A codeword may be transformed into a radio signal via the signal processing circuit 1000 of FIG. 19. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 19. For example, the wireless device (e.g., 100 or 200 of FIG. 18) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 20 illustrates another example of a wireless device applied to the disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 18. For example, the transceiver(s) 114 may include the one or more transceivers 106 and 106 and/or the one or more antennas 108 and 108 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Portable Device Example to which Disclosure is Applied FIG. 21 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 21, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 20, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data in the wireless communication system of the present disclosure has been described in connection with examples in which it applies to 3GPP LTE/LTE-A system and 5G systems (new RAT systems), the method is also applicable to other various wireless communication systems.

What is claimed is:

1. A method for receiving data by a user equipment (UE) supported by a plurality of base stations in wireless communication system, the method comprising:
    receiving, from a first base station, first downlink control information (DCI), and receiving, from a second base station, second DCI; and
    receiving, from the first base station, first data in a first resource region and a second resource region allocated based on the first DCI, and receiving, from the second base station, second data in the first resource region allocated based on the second DCI,
    wherein rate matching of resources related to a Demodulation Reference Signal (DMRS) is configured differently in the first resource region and the second resource region, the DMRS includes a first DMRS of the first base station and a second DMRS of the second base station,
    wherein information related to the rate matching included in the first DCI is configured based on resource allocation information for the second data included in the second DCI, and rate matching of a resource related to the second DMRS is configured in only the first resource region based on the resource allocation information.

2. The method of claim 1,
    wherein the first DCI includes information related to the first DMRS, and the second DCI includes information related to the second DMRS.

3. The method of claim 2,
    wherein rate matching of resources related to the first DMRS and the second DMRS is configured in the first resource region, and rate matching of resources only related to the first DMRS is configured in the second resource region.

4. The method of claim 2,
    wherein each of the first DCI and the second DCI includes information related to the rate matching.

5. The method of claim 1,
    wherein in the first resource region, rate matching of a resource related to the first DMRS and puncturing of a resource related to the second DMRS are configured, and
    wherein in the second resource region, rate matching is configured to only the resource related to the first DMRS.

6. The method of claim 2,
    wherein information related to the first DMRS includes a first DMRS port group to which one or more ports for the first base station belongs,
    wherein information related to the second DMRS includes a second DMRS port group to which one or more ports for the second base station belongs.

7. The method of claim 6,
    wherein a resource region in which the first data is received is determined based on the first DMRS port group, and
    wherein a resource region in which the second data is received is determined based on the second DMRS port group.

8. The method of claim 7,
    wherein the second DMRS port group is only associated with rate matching of the first resource region.

9. A user equipment (UE) receiving data supported by a plurality of base stations in a wireless communication system, the UE comprising:
    one or more transceivers;
    one or more processors; and
    one or more memories that store instructions for operations executed by the one or more processors, and are connected to the one or more processors,
    wherein the operations include:
    receiving, from a first base station, first downlink control information (DCI), and receiving, from a second base station, second DCI; and
    receiving, from the first base station, first data in a first resource region and a second resource region allocated based on the first DCI, and receiving, from the second base station, second data in the first resource region allocated based on the second DCI, wherein rate matching of resources related to a Demodulation Reference Signal (DMRS) is configured differently in the first resource region and the second resource region, the DMRS includes a first DMRS of the first base station and a second DMRS of the second base station, wherein information related to the rate matching included in the first DCI is configured based on resource allocation information for the second data included in the second DCI, and rate matching of a resource related to the second DMRS is configured in only the first resource region based on the resource allocation information.

10. A method of transmitting data by a base station (BS) in wireless communication system, the method comprising:

transmitting, a user equipment (UE), downlink control information (DCI), and transmitting, to the UE, the data in a resource region allocated for the data based on the DCI, wherein the resource region includes a first resource region used overlapping with another base station and a second resource region independently used by the base station, and wherein rate matching of resources related to a Demodulation Reference Signal (DMRS) is configured differently in the first resource region and the second resource region, the DMRS includes a first DMRS of the base station and a second DMRS of the another base station, the DCI includes information related to the rate matching, wherein the information related to the rate matching is configured based on resource allocation information of the another base station, and rate matching of a resource related to the second DMRS is configured in only the first resource region based on the resource allocation information.

11. The method of claim 10, wherein rate matching of resources related to the first DMRS and the second DMRS is configured in the first resource region, and rate matching of resources only related to the first DMRS is configured in the second resource region.

12. The method of claim 11, wherein puncturing is performed instead of rate matching of a resource related to the second DMRS, in the first resource region.

13. A base station (BS) of transmitting data in a wireless communication system, the BS comprising:

one or more transceivers;

one or more processors; and one or more memories that store instructions for operations executed by the one or more processors, and are connected to the one or more processors, wherein the operations include:

transmitting, a user equipment (UE), downlink control information (DCI), and transmitting, to the UE, the data in a resource region allocated for the data based on the DCI, wherein the resource region includes a first resource region used overlapping with another base station and a second resource region independently used by the base station, and wherein rate matching of resources related to a Demodulation Reference Signal (DMRS) is configured differently in the first resource region and the second resource region, the DMRS includes a first DMRS of the base station and a second DMRS of the another base station, the DCI includes information related to the rate matching, wherein the information related to the rate matching is configured based on resource allocation information of the another base station, and rate matching of a resource related to the second DMRS is configured in only the first resource region based on the resource allocation information.

14. A device comprising one or more memories and one or more processors functionally connected to the one or more memories, wherein the one or more processors control the device to:

receive, from a first base station, first downlink control information (DCI), and receive, from a second base station, second DCI; and receive, from the first base station, first data in a first resource region and a second resource region allocated based on the first DCI, and receive, from the second base station, second data in the first resource region allocated based on the second DCI, wherein rate matching of resources related to a Demodulation Reference Signal (DMRS) is configured differently in the first resource region and the second resource region, the DMRS includes a first DMRS of the first base station and a second DMRS of the second base station, wherein information related to the rate matching included in the first DCI is configured based on resource allocation information for the second data included in the second DCI, and rate matching of a resource related to the second DMRS is configured in only the first resource region based on the resource allocation information.

15. One or more non-transitory computer-readable medium storing one or more instructions, wherein the one or more instructions, which are executable by one or more processors, control a user equipment (UE) to:

receive, from a first base station, first downlink control information (DCI), and receive, from a second base station, second DCI; and receive, from the first base station, first data in a first resource region and a second resource region allocated based on the first DCI, and receive, from the second base station, second data in the first resource region allocated based on the second DCI, wherein rate matching of resources related to a Demodulation Reference Signal (DMRS) is configured differently in the first resource region and the second resource region, the DMRS includes a first DMRS of the first base station and a second DMRS of the second base station, wherein information related to the rate matching included in the first DCI is configured based on resource allocation information for the second data included in the second DCI, and rate matching of a resource related to the second DMRS is configured in only the first resource region based on the resource allocation information.

* * * * *